US010925054B2

(12) United States Patent
Miao et al.

(10) Patent No.: US 10,925,054 B2
(45) Date of Patent: Feb. 16, 2021

(54) CONFIGURABLE RESYNCHRONIZATION SIGNAL (RSS) FOR MACHINE TYPE COMMUNICATION (MTC) IN NEW RADIO (NR) SYSTEMS

(71) Applicant: Apple Inc., Cupertino, CA (US)

(72) Inventors: Honglei Miao, Nuremberg (DE); Alexei Davydov, Nizhny Novgorod (RU); Seunghee Han, San Jose, CA (US); Gang Xiong, Beaverton, OR (US); Yushu Zhang, Beijing (CN); Dae Won Lee, Portland, OR (US); Alexey Khoryaev, Nizhny Novgorod (RU); Mikhail Shilov, Nizhny Novgorod (RU); Sergey Panteleev, Nizhny Novgorod (RU); Kilian Roth, Munich (DE); Leonardo Gomes Baltar, Munich (DE); Gregory Morozov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/409,183

(22) Filed: May 10, 2019

(65) Prior Publication Data
US 2019/0268904 A1 Aug. 29, 2019

Related U.S. Application Data

(63) Continuation of application No. PCT/CN2018/088488, filed on May 25, 2018.
(Continued)

(51) Int. Cl.
*H04L 5/00* (2006.01)
*H04W 72/04* (2009.01)
(Continued)

(52) U.S. Cl.
CPC .......... *H04W 72/0446* (2013.01); *H04L 5/00* (2013.01); *H04W 4/70* (2018.02); *H04W 52/02* (2013.01); *H04W 56/001* (2013.01)

(58) Field of Classification Search
CPC .......... H04W 72/0446; H04W 56/001; H04W 52/02; H04W 4/70; H04L 5/00
(Continued)

(56) References Cited

U.S. PATENT DOCUMENTS

2015/0215910 A1* 7/2015 Han .................. H04W 56/0045
370/329
2016/0105862 A1* 4/2016 Charbit .................. H04L 7/027
370/336
(Continued)

*Primary Examiner* — Faisal Choudhury
(74) *Attorney, Agent, or Firm* — Kowert, Hood, Munyon, Rankin & Goetzel, P C.

(57) ABSTRACT

Embodiments of a Machine Type Communication User Equipment (MTC UE), Next Generation Node-B (gNB) and methods of communication are generally described herein. The MTC UE may determine a system timing based on reception of a primary synchronization signal (PSS) and a secondary synchronization signal (SSS). The MTC UE may receive, from the gNB, radio resource control (RRC) signaling that indicates one or more parameters of a configurable resynchronization signal (RSS). The RSS may be for resynchronization, by the MTC UE, after the MTC UE awakens from a power save mode. The parameters of the RSS in the RRC signaling may depend on a target coverage of the MTC UE. The MTC UE may determine an updated system timing based on reception of the RSS.

21 Claims, 22 Drawing Sheets

Related U.S. Application Data

(60) Provisional application No. 62/671,173, filed on May 14, 2018.

(51) Int. Cl.
 *H04W 56/00* (2009.01)
 *H04W 52/02* (2009.01)
 *H04W 4/70* (2018.01)

(58) Field of Classification Search
 USPC .......................................................... 370/329
 See application file for complete search history.

(56) References Cited

U.S. PATENT DOCUMENTS

| | | | |
|---|---|---|---|
| 2018/0007709 A1* | 1/2018 | Seo | H04W 72/1278 |
| 2018/0205512 A1* | 7/2018 | You | H04W 4/70 |
| 2018/0270771 A1* | 9/2018 | Chendamarai Kannan | H04J 11/0073 |
| 2018/0279239 A1* | 9/2018 | Si | H04W 76/28 |
| 2019/0306667 A1* | 10/2019 | Kim | H04B 17/27 |
| 2019/0380154 A1* | 12/2019 | Wei | H04W 74/0833 |

\* cited by examiner

1000

1050

1500

1550

1700

6 ports: 2FDM × 3CDM in FDM 8 ports: 2FDM × 4CDM in FDM+TDM

1750

If AGC and TX/RX switching utilizes less than half symbol then additional data symbol may be added If AGC and TX/RX switching utilizes less than half symbol then additional data symbol may be added

CONFIGURABLE RESYNCHRONIZATION SIGNAL (RSS) FOR MACHINE TYPE COMMUNICATION (MTC) IN NEW RADIO (NR) SYSTEMS

PRIORITY CLAIM

This application claims priority under 35 USC 119(e) to U.S. Provisional Patent Application Ser. No. 62/671,173, filed May 14, 2018 [reference number AB1367-Z (1884.779PRV)], and to International Application No. PCT/CN2018/088488, filed May 25, 2018 [reference number AB1854-PCT-Z], both of which are incorporated herein by reference in their entirety.

TECHNICAL FIELD

Embodiments pertain to wireless networks. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to machine type communication (MTC). Some embodiments relate to resynchronization signals (RSSs).

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
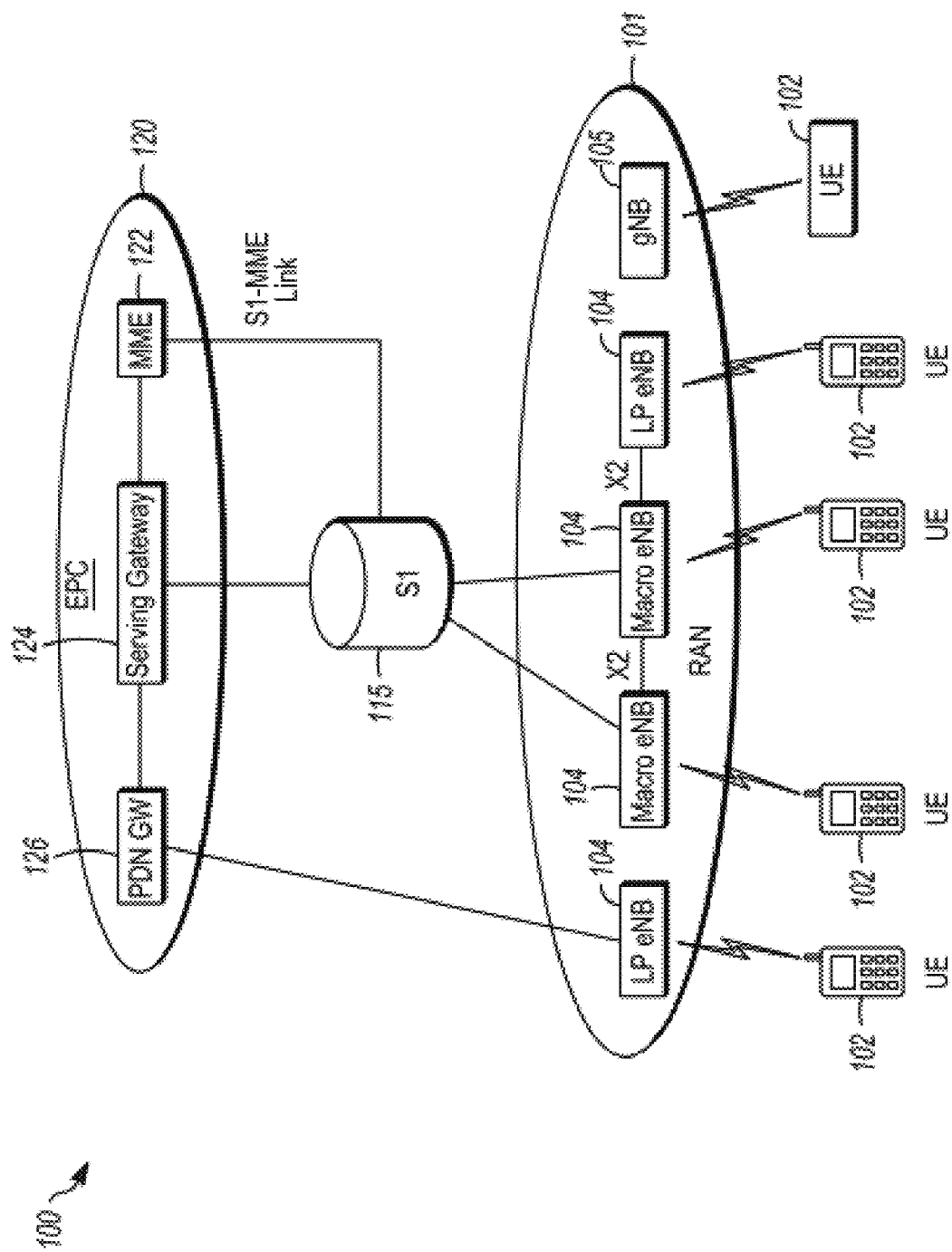
FIG. 1A is a functional diagram of an example network in accordance with some embodiments.
Figure 1B:
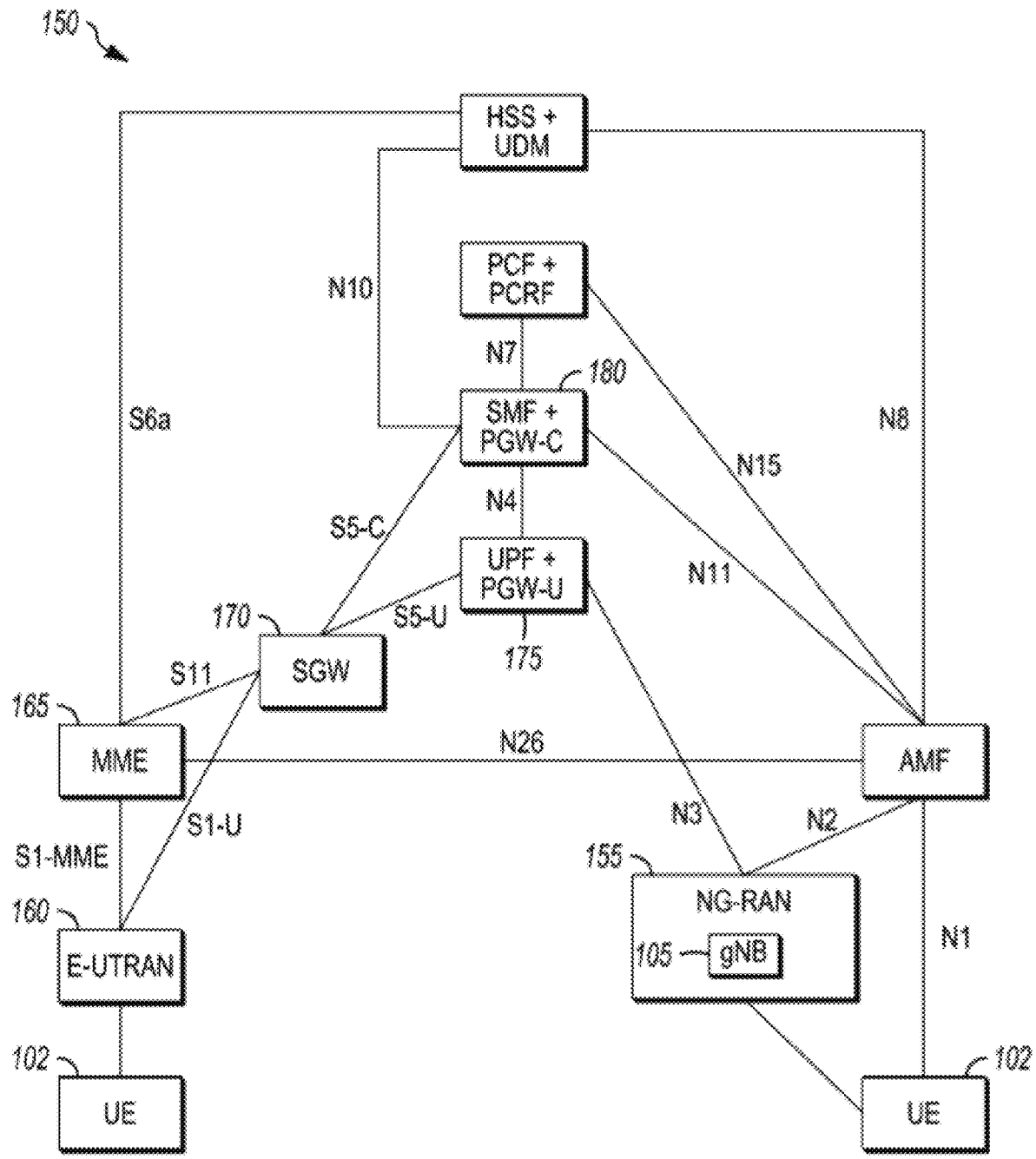
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105, and/or eNBs 104 may be configured to operate in accordance with an NR protocol and/or NR techniques. References to a MTC UE 102, UE 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may be a machine type communication (MTC) UE 102. In some embodiments, the UE 102 may support MTC operation. In some embodiments, the UE 102 may be configured for MTC operation. In some embodiments, the UE 102 may be configured to operate in accordance with in MTC technique and/or an MTC protocol. In some embodiments, the UE 102 may be configured to communicate in accordance with an MTC technique and/or an MTC protocol.

References herein to an MTC UE 102 are not limiting. In some cases, descriptions of embodiments related to an MTC UE 102 (including but not limited to descriptions of techniques, operations and/or methods that may be performed by the MTC UE 102) may be applicable to embodiments related to a UE 102. For instance, the UE 102 (which may or may not be configured to operate in accordance with MTC) may perform one or more of the techniques, operations and/or methods performed by an MTC UE 102 in some of the descriptions herein, in some embodiments.

References herein to a UE 102 are also not limiting. In some cases, descriptions of embodiments related to a UE 102 (including but not limited to descriptions of techniques, operations and/or methods that may be performed by the UE 102) may be applicable to embodiments related to an MTC UE 102. For instance, the MTC UE 102 may perform one or more of the techniques, operations and/or methods performed by a UE 102 in some of the descriptions herein, in some embodiments.

In some embodiments, the MTC UE 102 and/or UE 102 may transmit signals (data, control and/or other) to the gNB 105, and may receive signals (data, control and/or other) from the gNB 105. In some embodiments, the MTC UE 102 and/or UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for an MTC UE 102 and/or a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, MTC UEs 102 and/or UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a MTC UE 102 and/or a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to an MTC UE 102 and/or a UE 102, while uplink transmission from the MTC UE 102 and/or the UE 102 to the eNB 104 may utilize similar techniques. In some embodiments, a downlink resource grid may be used for downlink transmissions from a gNB 105 to an MTC UE 102 and/or a UE 102, while uplink transmission from the MTC UE 102 and/or the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
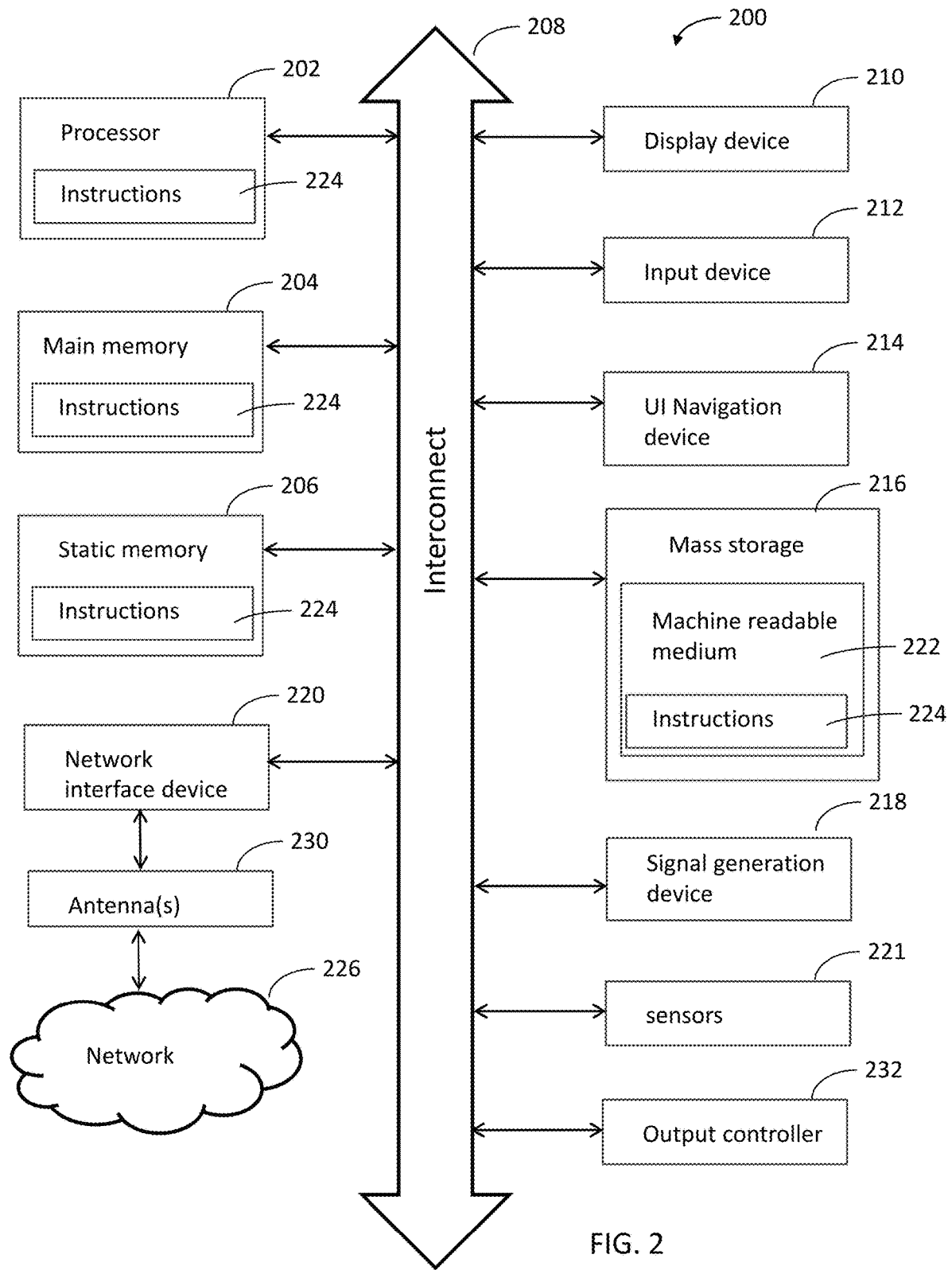
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an MTC UE 102, UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
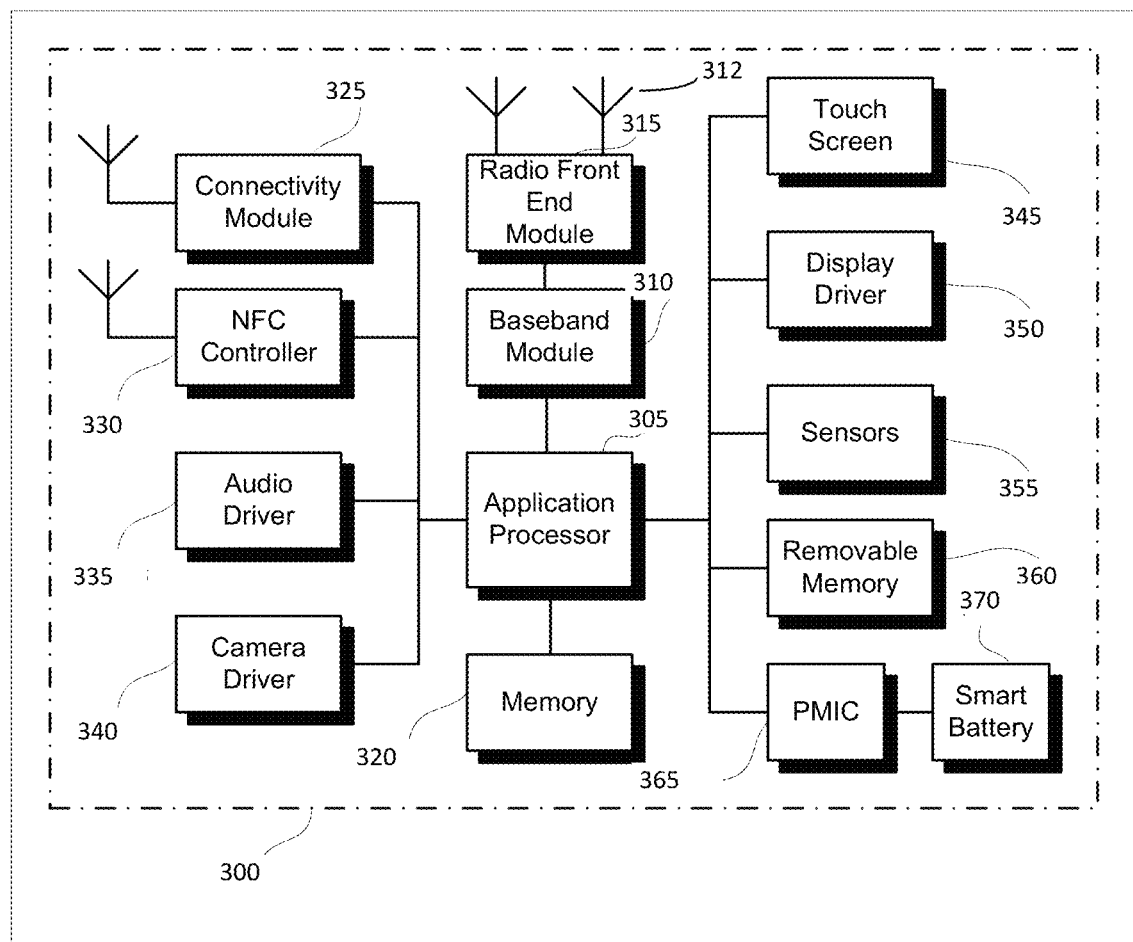
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as an MTC UE 102 and/or a UE 102 as depicted in FIG. 1, in some embodiments. It should be noted that in some embodiments, an MTC UE, an apparatus of an MTC UE, a UE, an apparatus of a UE, a user device or an apparatus of a user device may include one or more of the components shown in one or more of FIGS. 2, 3, and 5. In some embodiments, such an MTC UE, UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
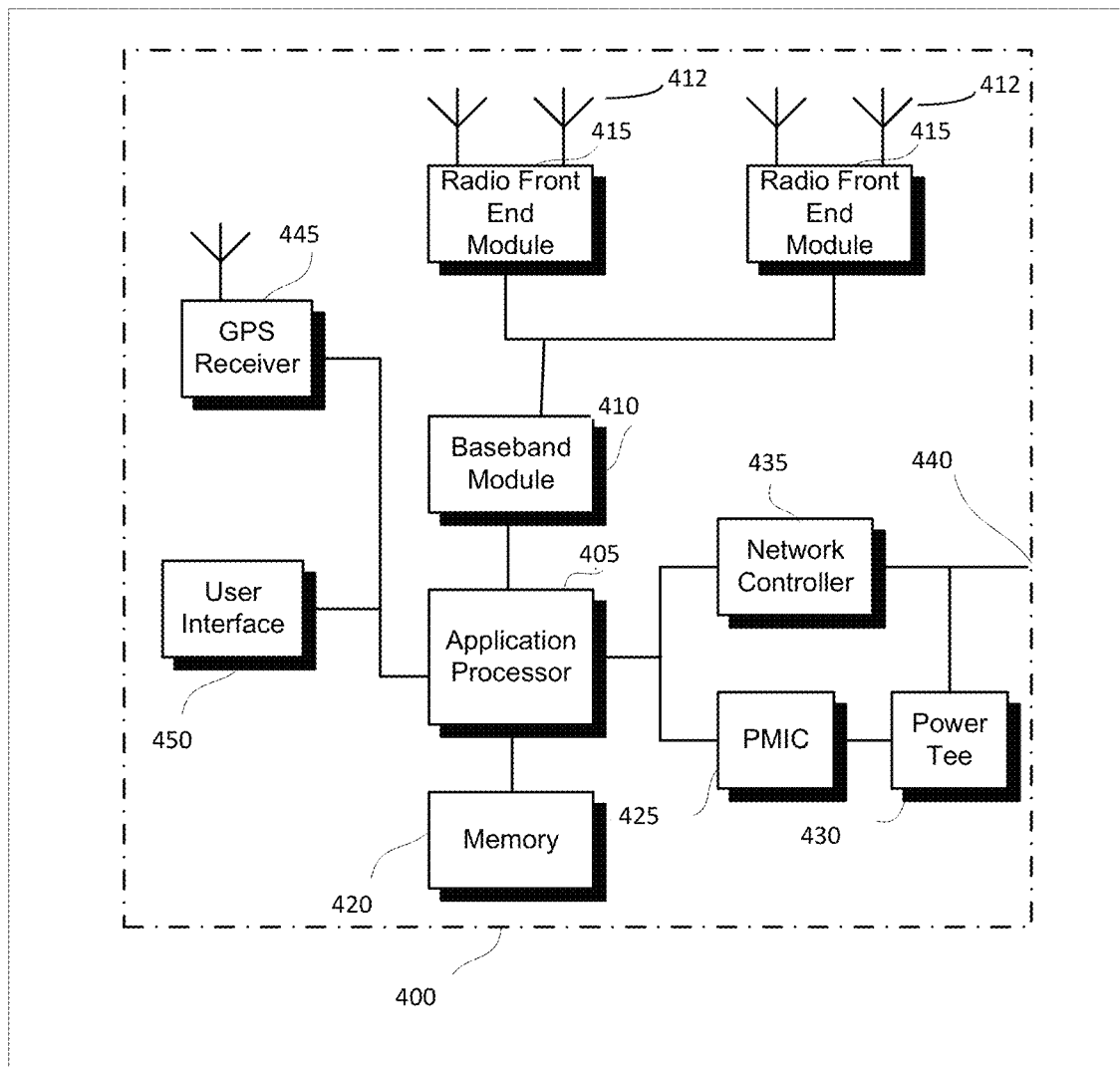
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAIVI) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
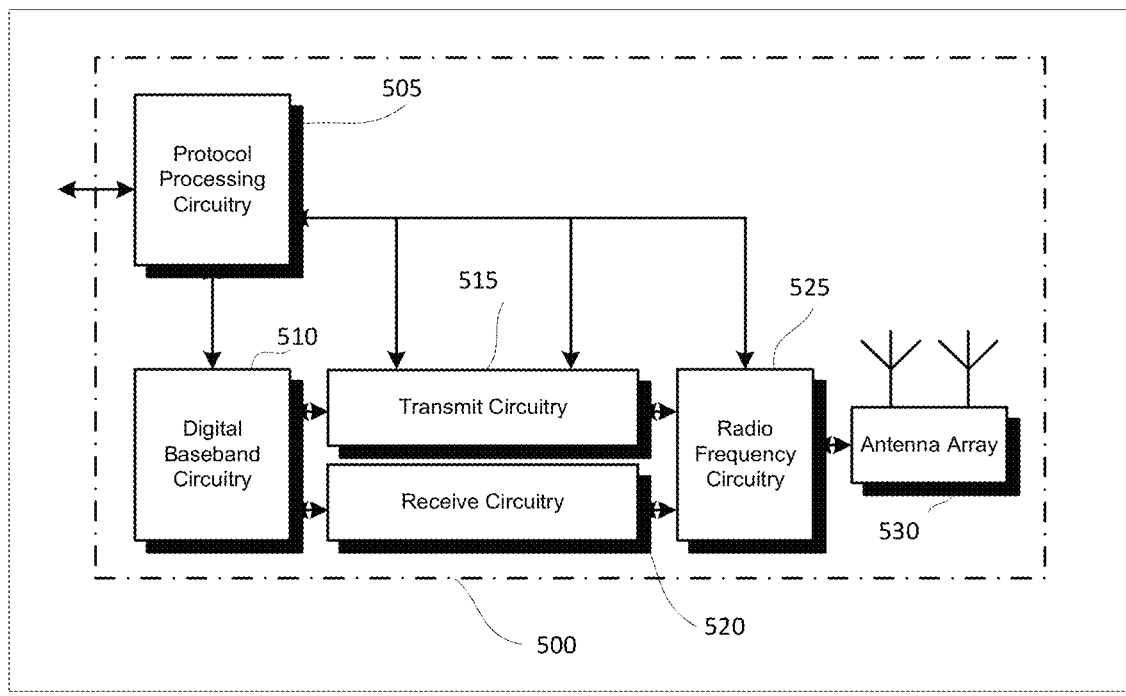
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as an MTC UE 102, UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARM) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the MTC UE 102, UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the MTC UE 102, UE 102, eNB 104, gNB 105, user device 300, base station 400, machine 200 and/or other device described herein may be configured to operate in accordance with 3GPP standards, although the scope of the embodiments is not limited in this respect. In some embodiments, the MTC UE 102, UE 102, eNB 104, gNB 105, user device 300, base station 400, machine 200 and/or other device described herein may be configured to operate in accordance with new radio (NR) standards, although the scope of the embodiments is not limited in this respect. In some embodiments, the MTC UE 102, UE 102, eNB 104, gNB 105, user device 300, base station 400, machine 200 and/or other device described herein may be configured to operate according to other protocols or standards, including IEEE 802.11 or other IEEE standards. In some embodiments, the MTC UE 102, UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the MTC UE 102, UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the MTC UE 102, UE 102, eNB 104, gNB 105, machine 200, user device 300 and/or base station 400 may include various components shown in FIGS. 2-5. Accordingly, techniques and operations described herein that refer to the MTC UE 102 may be applicable to an apparatus of an MTC UE. In addition, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
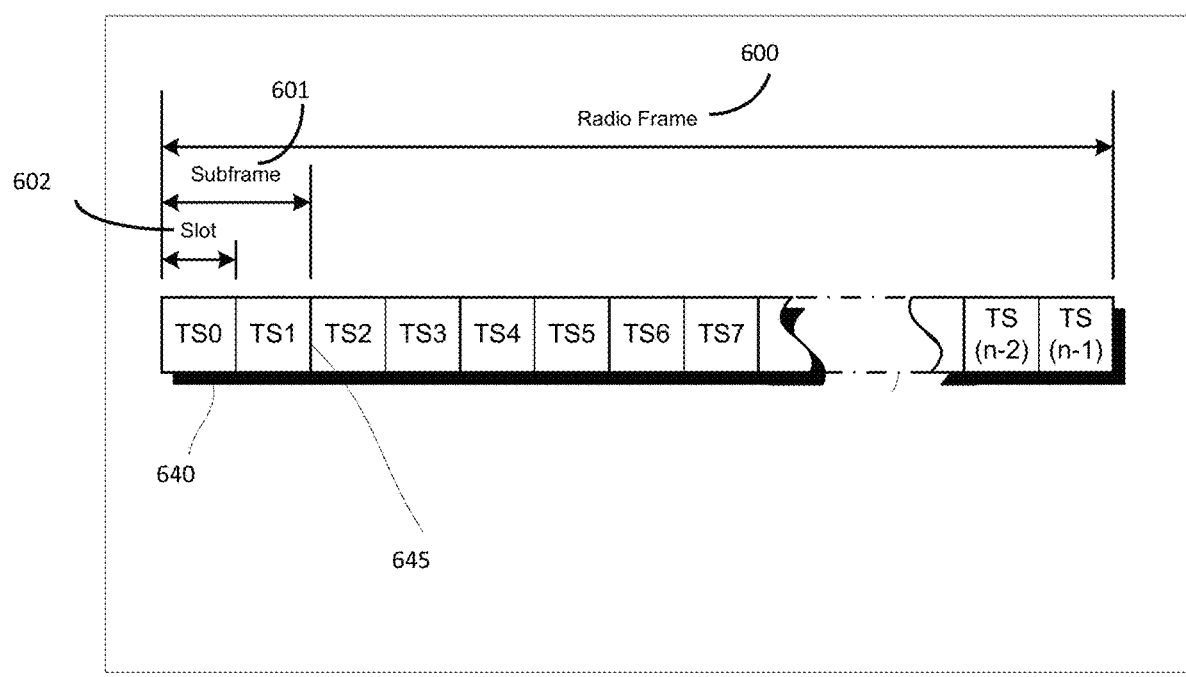
FIG. 6 illustrates an example of a radio frame structure in accordance with some embodiments.
Figures 7A, 7B:
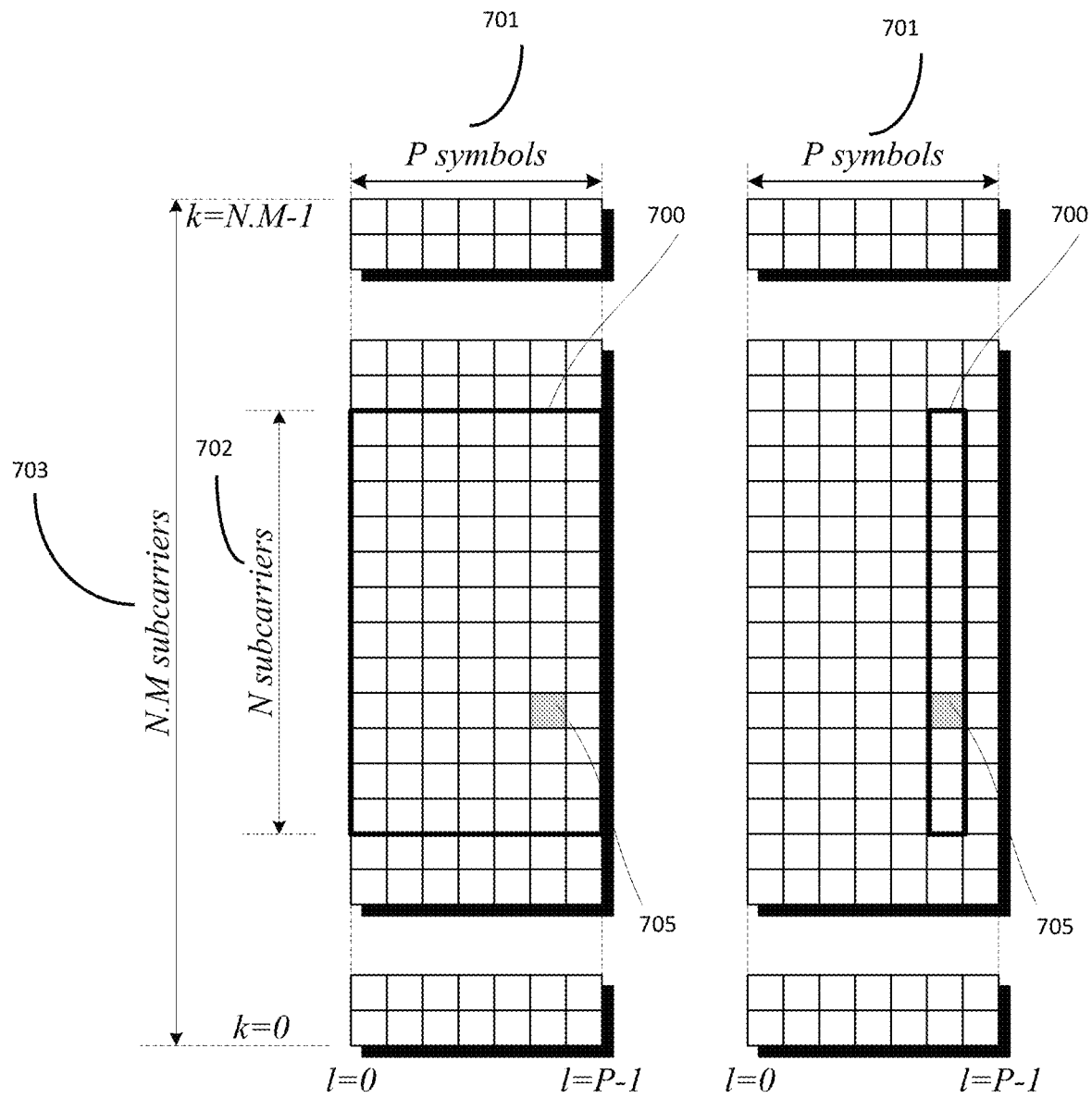
FIG. 7A and FIG. 7B illustrate example frequency resources in accordance with some embodiments.

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10$ms$. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a sub-component of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N.M−1 (as indicated by 703), where N is the number of subcarriers in a resource block, and M is the number of resource blocks spanning a component carrier in the frequency domain.

In accordance with some embodiments, a machine type communication (MTC) User Equipment (UE) 102 may be configured to operate in a new radio (NR) network. The MTC UE 102 may decode a primary synchronization signal (PSS) and a secondary synchronization signal (SSS) received from a gNB 105. The MTC UE 102 may determine a system timing based on reception of the PSS and the SSS. The MTC UE 102 may decode radio resource control (RRC) signaling from the gNB 105. The RRC signaling may be received in accordance with the determined system timing. The RRC signaling may indicate parameters of a resynchronization signal (RSS) for resynchronization by the MTC UE 102 after the MTC UE 102 awakens from a power save mode. The parameters of the RSS in the RRC signaling may depend on a target coverage of the MTC UE 102. The RSS may include a primary RSS (PRSS) and a secondary RSS (SRSS). The parameters of the RSS in the RRC signaling may include a starting physical resource block (PRB) of the PRSS. The MTC UE 102 may decode the RSS. The RSS may be received from the gNB 105. The MTC UE 102 may determine an updated system timing based on reception of the RSS. These embodiments are described in more detail below.

Figure 8:
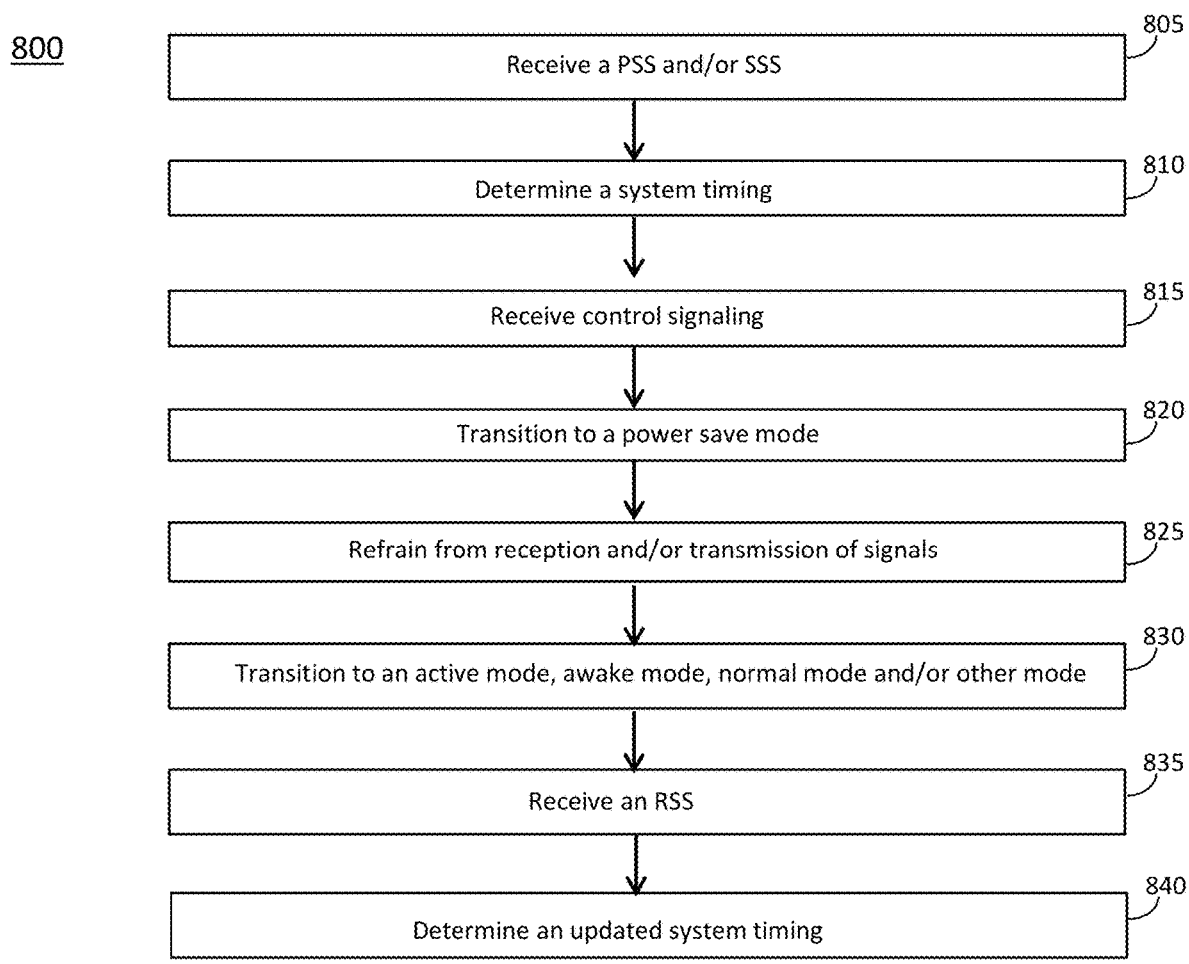
FIG. 8 illustrates the operation of a method of communication in accordance with some embodiments.
Figure 9:
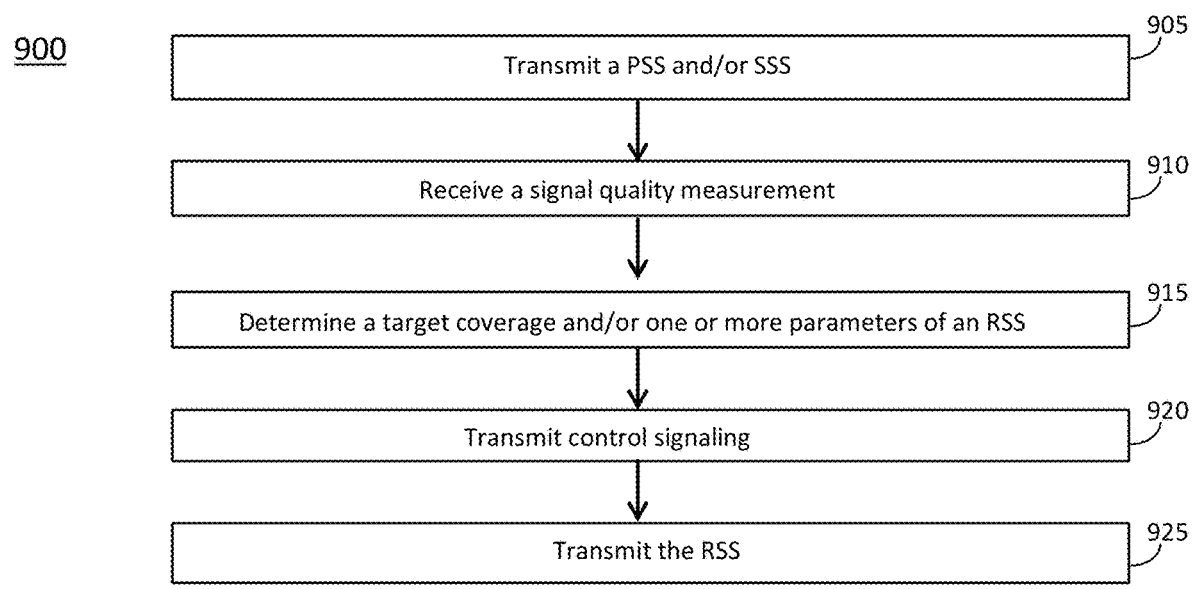
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, an MTC UE 102 may perform one or more operations of the method 800, but embodiments are not limited to performance of the method 800 and/or operations of it by the MTC UE 102. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the gNB 105 may perform an operation that may be the same as, similar to, reciprocal to and/or related to an operation of the method 800, in some embodiments. In another non-limiting example, a UE 102 (which may be configured for MTC operation) may perform an operation that may be the same as, similar to, reciprocal to and/or related to an operation of the method 800, in some embodiments. In another non-limiting example, a UE 102 (which may not necessarily be configured for MTC operation) may perform an operation that may be the same as, similar to, reciprocal to and/or related to an operation of the method 800, in some embodiments.

In some embodiments, a gNB 105 may perform one or more operations of the method 900, but embodiments are not limited to performance of the method 900 and/or operations of it by the gNB 105. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900. In a non-limiting example, the MTC UE 102 may perform an operation that may be the same as, similar to, reciprocal to and/or related to an operation of the method 900, in some embodiments. In another non-limiting example, the UE 102 (which may be configured for MTC operation) may perform an operation that may be the same as, similar to, reciprocal to and/or related to an operation of the method 900, in some embodiments. In another non-limiting example, the UE 102 (which may not necessarily be configured for MTC operation) may perform an operation that may be the same as, similar to, reciprocal to and/or related to an operation of the method 900, in some embodiments. In another non-limiting example, the eNB 104 may perform an operation that may be the same as, similar to, reciprocal to and/or related to an operation of the method 900, in some embodiments It should be noted that one or more operations of one of the methods 800, 900 may be the same as, similar to and/or reciprocal to one or more operations of the other method. For instance, an operation of the method 800 may be the same as, similar to and/or reciprocal to an operation of the method 900, in some embodiments. In a non-limiting example, an operation of the method 800 may include reception of an element (such as a frame, block, message and/or other) by the MTC UE 102, and an operation of the method 900 may include transmission of a same element (and/or similar element) by the gNB 105. In some cases, descriptions of operations and techniques described as part of one of the methods 800, 900 may be relevant to the other method.

Discussion of various operations, techniques and/or concepts regarding one of the methods 800, 900 and/or other method may be applicable to one of the other methods, although the scope of embodiments is not limited in this respect. Such operations, techniques and/or concepts may be related to PSS, SSS, RSS, PRSS, SRSS, RRC signaling, SIB, control signaling, MTC operation and/or other.

The methods 800, 900 and other methods described herein may refer to eNBs 104, gNBs 105, MTC UEs 102 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 may also be applicable to an apparatus of an MTC UE 102, an apparatus of a UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. Embodiments are not limited to usage of those elements, however. In some embodiments, other elements may be used, including other element(s) in a same standard/protocol, other element(s) in another standard/protocol and/or other. In addition, the scope of embodiments is not limited to usage of elements that are included in standards.

In some embodiments, the MTC UE 102 may be configured for MTC operation in an NR network, although the scope of embodiments is not limited in this respect. In some embodiments, the MTC UE 102 may be configured to operate in an NR network. In some embodiments, the MTC UE 102 may be arranged to operate in accordance with an NR protocol. In some embodiments, the gNB 105 may be configured to perform one or more operations related to MTC in an NR network, although the scope of embodiments is not limited in this respect. In some embodiments, the gNB 105 may be arranged to operate in accordance with an NR protocol. In some embodiments, the gNB 105 may be configured to operate in an NR network.

At operation 805, the MTC UE 102 may receive a primary synchronization signal (PSS) and/or secondary synchronization signal (SSS). At operation 810, the MTC UE 102 may determine a system timing. At operation 815, the MTC UE 102 may receive control signaling. In some embodiments, the control signaling may include RRC signaling. In some embodiments, the control signaling may include a system information block (SIB). At operation 820, the MTC UE 102 may transition to a power save mode. At operation 825, the MTC UE 102 may refrain from reception and/or transmission of signals. At operation 830, the MTC UE 102 may transition to an active mode, awake mode, normal mode and/or other mode. At operation 835, the MTC UE 102 may receive a resynchronization signal (RSS). At operation 840, the MTC UE 102 may determine an updated system timing.

In some embodiments, the MTC UE 102 may receive a primary synchronization signal (PSS) and/or a secondary synchronization signal (SSS) from the gNB 105. The MTC UE 102 may determine a system timing based at least partly on one or more of: reception of the PSS, reception of the SSS and/or other operations. In some embodiments, the system timing may be related to one or more of: a reference timing, a timing based on a start of a sub-frame, a timing based on a start of a slot, a timing based on a start of an OFDM symbol, a timing based on a start of another element, and/or other. Embodiments are not limited to the above, as the system timing may be related to other timing or to other elements, in some embodiments.

In some embodiments, the MTC UE 102 may receive RRC signaling from the gNB 105. The RRC signaling may be received in accordance with the determined system timing, although the scope of embodiments is not limited in this respect. In some embodiments, the RRC signaling may indicate one or more parameters related to a resynchronization signal (RSS). In some embodiments, the RRC signaling may include other information.

Although some of the techniques, operations and/or methods may describe usage of the RRC signaling and/or parameters of the RSS included in the RRC signaling, embodiments are not limited to usage of the RRC signaling for communication of parameters/information related to the RSS. Other control signaling and/or other element(s) may be used to communicate parameters/information related to the RSS and/or other information, in some embodiments. Accordingly, the MTC UE 102 may receive RRC signaling, control signaling and/or other element(s) that indicate parameters/information related to the RSS (including but not limited to parameters/information described herein), in some embodiments. In a non-limiting example, the MTC UE 102 may receive one or more SIBs that indicate parameters/information related to the RSS. In another non-limiting example, the MTC UE 102 may receive one or more other elements (messages, signaling, blocks and/or other) that indicate parameters/information related to the RSS.

In some embodiments, the RSS may be for one or more of the following: resynchronization by the MTC UE 102, resynchronization by the MTC UE 102 after the MTC UE 102 awakens from a power save mode, cell selection by the MTC UE 102, cell selection by the MTC UE 102 after the MTC UE 102 awakens from the power save mode, and/or other. The scope of embodiments is not limited to the above, as the RSS may be for other purpose(s), in some embodiments.

In some embodiments, the parameters of the RSS may depend on a target coverage of the MTC UE 102, although the scope of embodiments is not limited in this respect. In a non-limiting example, the gNB 105 may determine a target coverage of the MTC UE 102, and may determine one or more parameters of the RSS based on the determined target coverage. For instance, the gNB 105 may determine the parameters of the RSS based on a target performance (in terms of one or more metrics like signal quality, decoded error rate and/or other) of the MTC UE 102.

In some embodiments, the RSS may include a primary RSS (PRSS) and a secondary RSS (SRSS), although the scope of embodiments is not limited in this respect.

Non-limiting examples of parameters of the RSS that may be included in the RRC signaling are described below. In some embodiments, the RRC signaling may include one or more of the parameters described below. In some embodiments, the RRC signaling may include one or more additional parameters. In some embodiments, the RRC signaling may not necessarily include all of the parameters described below.

In some embodiments, the RRC signaling may include a starting physical resource block (PRB) of the PRSS. In some embodiments, the RRC signaling may include one or more of: a number of continuous slots allocated for the PRSS; a starting orthogonal frequency division multiplexing (OFDM) symbol of the PRSS within each of the continuous slots allocated for the PRSS; a number of physical resource blocks (PRBs) allocated for the PRSS. In a non-limiting example, the number of continuous slots allocated for the PRSS may be one of 4, 8, 16, 32, 48, and 64. In a non-limiting example, the number of PRBs allocated for the PRSS may be one of 2, 4, and 6. Embodiments are not limited to the example numbers/values given above, as other numbers/values may be used in some embodiments.

In some embodiments, the RRC signaling may include one or more parameters related to a number of diversity repetitions of the RSS. In some embodiments, the RRC signaling may include one or more parameters related to a number of diversity repetitions of the RSS corresponding to the target coverage of the MTC UE 102.

In some embodiments, the RRC signaling may include one or more of: a number of continuous slots allocated for the SRSS; a starting OFDM symbol of the SRSS within each of the continuous slots allocated for the SRSS; a number of PRBs allocated for the SRSS; and a starting PRB of the SRSS.

In some embodiments, the RSS may include periodic RSS bursts. In some embodiments, each RSS burst may include a PRSS and a SRSS. In some embodiments, one or more of the RSS bursts may include a PRSS and a SRSS. In some embodiments, the RRC signaling may include a parameter related to a periodicity of the RSS bursts.

In some embodiments, the RRC signaling may include a time duration for quasi co-located (QCL) transmission of the PRSS on a same transmit antenna port. In a non-limiting example, the time duration of the QCL transmission of the PRSS may be indicated in terms of a number of repetitions of a base sequence of the PRSS.

In some embodiments, the RRC signaling may include a number of OFDM symbols for a base sequence of the PRSS. The MTC UE 102 may determine the base sequence of the PRSS based at least partly on the number of OFDM symbols for the base sequence of the PRSS, although the scope of embodiments is not limited in this respect. In a non-limiting example, the MTC UE 102 may detect the PRSS based at least partly on a correlation operation between a received signal and the base sequence of the PRSS.

In some embodiments, the MTC UE 102 may determine the PRSS based on one or more of: a first mapping of the base sequence of the PRSS to resource elements (REs) of the PRBs allocated for the PRSS; a second mapping of the base sequence of the PRSS to OFDM symbols of the slots allocated for the PRSS; one or more other mappings; and/or other. In some embodiments, the second mapping may be applied after the first mapping. Embodiments are not limited to these mappings or to the chronological order in which the mappings are applied. Other arrangements are possible.

In some embodiments, the RRC signaling may include one or more parameters related to the SRSS, including but not limited to one or more parameters that may be related to, similar to and/or analogous to one or more of the parameters related to the PRSS described above.

In some embodiments, the MTC UE 102 may decode the RSS. In some embodiments, the MTC UE 102 may receive the RSS from the gNB 105. In some embodiments, the MTC UE 102 may decode the RSS and/or receive the RSS from the gNB 105 in accordance with one or more of the parameters of the RSS included in the RRC signaling, although the scope of embodiments is not limited in this respect.

In some embodiments, the MTC UE 102 may determine an updated system timing based on reception of the RSS. In a non-limiting example, the MTC UE 102 may receive the RSS in accordance the system timing determined based on the PSS and/or SSS. In another non-limiting example, the MTC UE 102 may receive the RSS in accordance a previous value of the system timing used before the MTC UE 102 transitioned to the power save mode.

In some embodiments, the MTC UE 102 may transition to the power save mode. In some embodiments, the MTC UE 102 may transition to the power save mode from an active mode, normal mode and/or other mode, although the scope of embodiments is not limited in this respect. In some embodiments, the MTC UE 102 may refrain from reception of signals or transmission of signals for at least a portion of a duration of time in which the MTC UE 102 is in the power save mode, although the scope of embodiments is not limited in this respect. In some embodiments, the MTC UE 102 may awaken from the power save mode. In some embodiments, the MTC UE 102 may transition (from the power save mode or otherwise) to an active mode, normal mode and/or other mode. In some embodiments, the MTC UE 102 may receive the RSS after the MTC UE 102 awakens from the power save mode. In some embodiments, the MTC UE 102 may receive the RSS based on a previous value of the system timing used before the MTC UE 102 transitioned to the power save mode, although the scope of embodiments is not limited in this respect.

In some embodiments, the PSS and the SSS may be cell-specific based on a cell of the gNB 105, although the scope of embodiments is not limited in this respect. In some embodiments, the RSS may be UE-specific for the MTC UE 102, although the scope of embodiments is not limited in this respect.

In some embodiments, the MTC UE 102 may receive the PSS and the SSS in joint time and frequency resources that are at least partly non-overlapping with joint time and frequency resources allocated for the PRSS.

In some embodiments, the MTC UE 102 may perform one or more of: detect the PRSS and/or the SRSS; determine, based on a physical cell identifier (PCI) included in the PRSS and/or the SRSS, whether the RSS is from the gNB 105 or from another gNB 105; and communicate with the gNB 105 from which the RSS is received. One or more of the above may be performed as part of a cell selection, although the scope of embodiments is not limited in this respect.

In some embodiments, an apparatus of an MTC UE 102 may comprise memory. The memory may be configurable to store information related to the determined system timing. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not decoding of the RSS. The apparatus may include a transceiver to receive the RSS. The transceiver may transmit and/or receive other blocks, messages and/or other elements.

At operation 905, the gNB 105 may transmit a PSS and/or SSS. At operation 910, the gNB 105 may receive a signal quality measurement. At operation 915, the gNB 105 may determine a target coverage and/or one or more parameters of an RSS. At operation 920, the gNB 105 may transmit control signaling. In some embodiments, the control signaling may include RRC signaling. In some embodiments, the control signaling may include a system information block (SIB). At operation 925, the gNB 105 may transmit the RSS.

In some embodiments, the gNB 105 may transmit a PSS and an SSS. The gNB 105 may receive, from an MTC UE 102, signaling that indicates a signal quality measurement at the MTC UE 102. The gNB 105 may determine, based at least partly on the signal quality measurement, a number of diversity repetitions of an RSS to be used to achieve a target coverage for the MTC UE 102. In some embodiments, the RSS may be for resynchronization of the MTC UE 102 (including but not limited to resynchronization of the MTC UE 102 after the MTC UE 102 awakens from a power save mode), although the scope of embodiments is not limited in this respect. The gNB 105 may transmit RRC signaling that includes one or more parameters of the RSS. In some embodiments, the parameters of the RSS may be configurable based on the determined number of diversity repetitions of the RSS, although the scope of embodiments is not limited in this respect.

Although some of the techniques, operations and/or methods may describe usage of the RRC signaling and/or parameters of the RSS included in the RRC signaling, embodiments are not limited to usage of the RRC signaling for communication of parameters/information related to the RSS. Other control signaling and/or other element(s) may be used to communicate parameters/information related to the RSS and/or other information, in some embodiments. Accordingly, the gNB 105 may transmit RRC signaling, control signaling and/or other element(s) that indicate parameters/information related to the RSS (including but not limited to parameters/information described herein), in some embodiments. In a non-limiting example, the gNB 105 may transmit one or more SIBS that indicate parameters/information related to the RSS. In another non-limiting example, the gNB 105 may transmit one or more other elements (messages, signaling, blocks and/or other) that indicate parameters/information related to the RSS.

In some embodiments, the parameters of the RSS in the RRC signaling may include one or more of: a number of continuous slots allocated for the RSS; a number of PRBs allocated for the RSS; a number of diversity repetitions of the RSS corresponding to the target coverage of the MTC UE; a number of continuous slots allocated for the RSS; a starting OFDM symbol of the RSS within each of the continuous slots allocated for the RSS; a number of PRBs allocated for the RSS; a starting PRB of the RSS; a periodicity of the RSS; and/or other.

In some embodiments, the parameters of the RSS in the RRC signaling may include a time duration for quasi co-located (QCL) transmission of the RSS on a same transmit antenna port. In a non-limiting example, the time duration of the QCL transmission of the RSS may be indicated in terms of a number of repetitions of a base sequence of the RSS.

In some embodiments, the gNB 105 may receive, from an MTC UE 102, signaling that indicates a signal quality measurement at the MTC UE 102. The gNB 105 may determine a target coverage for the MTC UE 102 based at least partly on the signal quality measurement. The gNB 105 may determine, based on the target coverage, one or more parameters for a resynchronization signal (RSS) for resynchronization of the MTC UE 102. In some embodiments, the one or more parameters may include one or more of: a number of diversity repetitions of the RSS; a number of physical resource blocks (PRBs) to allocate for the RSS; a number of slots to allocate for the RSS; and/or other. The gNB 105 may transmit RRC signaling, a system information block (SIB) and/or other element(s) that indicate the one or more parameters for the RSS. The gNB 105 may encode the RSS for transmission in accordance with the one or more parameters for the RSS. In some embodiments, the gNB 105 may transmit a PSS and/or an SSS. The PSS and/or the SSS may be for an initial synchronization of the MTC UE 102, although the scope of embodiments is not limited in this respect. In some embodiments, the PSS and/or the SSS may be cell-specific based on a cell of the gNB 105. In some embodiments, the RSS may be UE-specific for the MTC UE 102.

In some embodiments, an apparatus of a gNB 105 may comprise memory. The memory may be configurable to store information related to the RSS. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to encoding of the RSS. The apparatus may include a transceiver to transmit the RSS. The transceiver may transmit and/or receive other blocks, messages and/or other elements.

Figure 10:
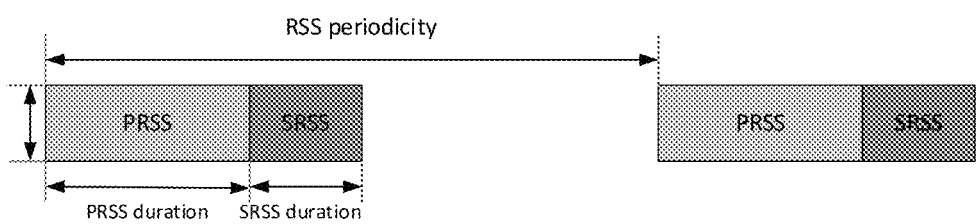
FIG. 10 illustrates examples related to resynchronization signals (RSSs) in accordance with some embodiments.
Figure 10:
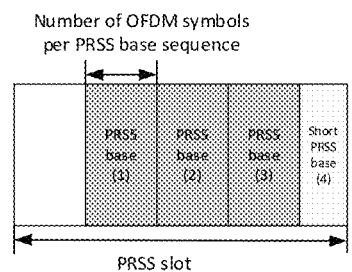
Figure 11:
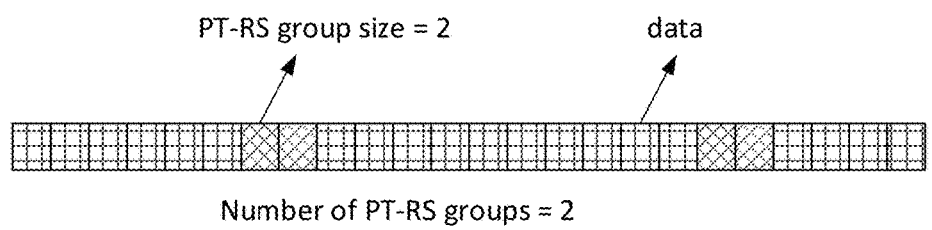
FIG. 11 illustrates examples related to phase tracking reference signals (PT-RSs) in accordance with some embodiments.
Figure 12:
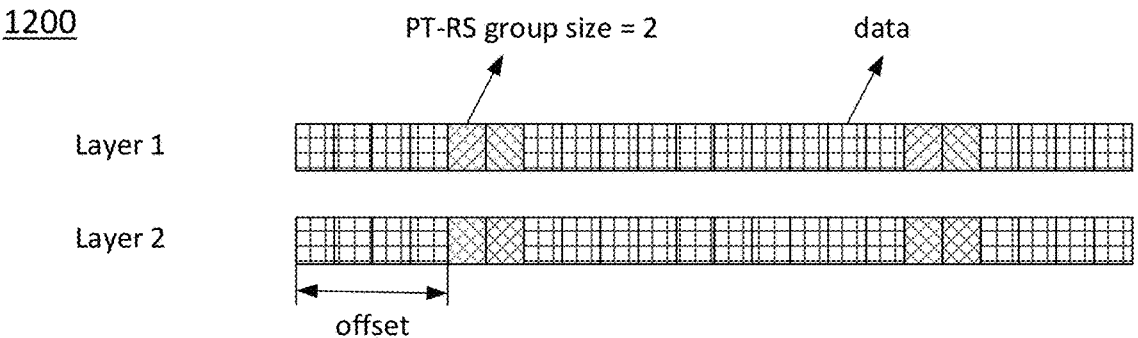
FIG. 12 illustrates examples related to PT-RSs in accordance with some embodiments.
Figure 12:
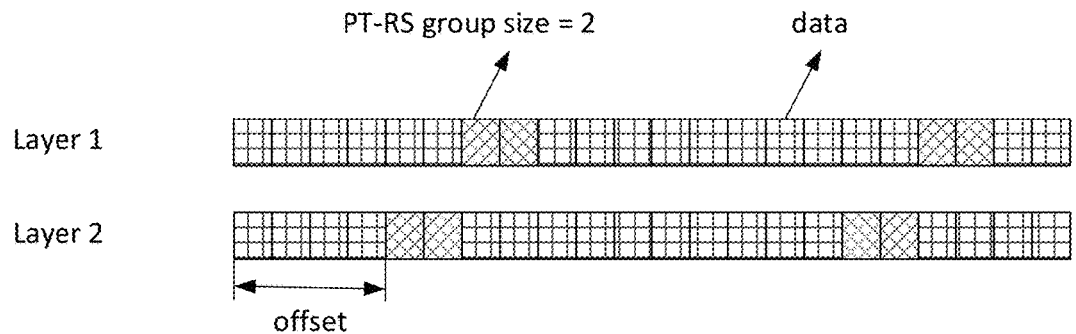
Figure 13:
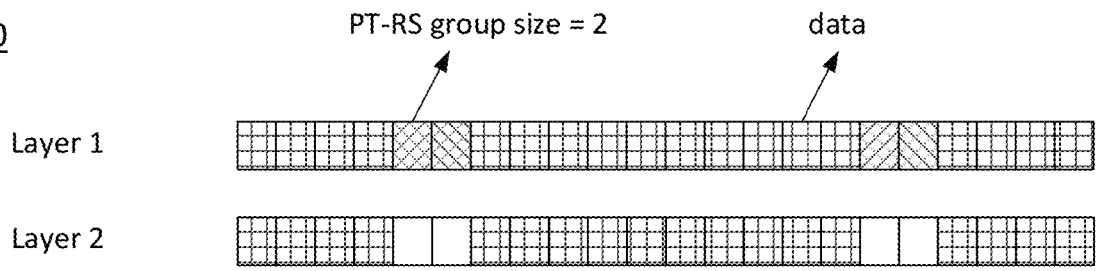
FIG. 13 illustrates examples related to PT-RSs in accordance with some embodiments.
Figure 13:
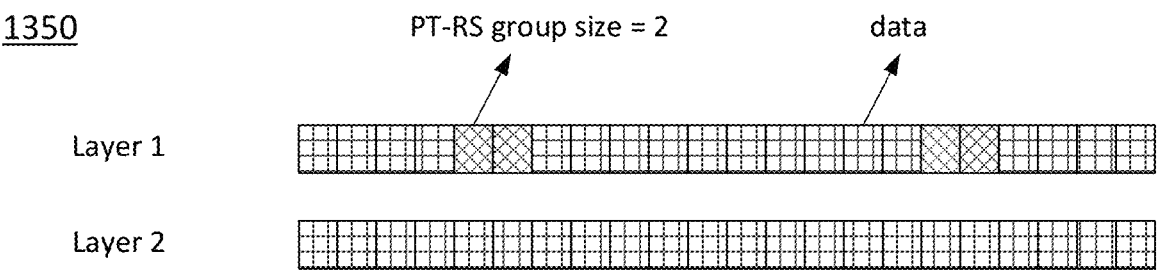

FIG. 10 illustrates examples related to resynchronization signals (RSSs) in accordance with some embodiments. FIGS. 11-13 illustrate examples related to phase tracking reference signals (PT-RSs) in accordance with some embodiments. FIGS. 14-17 illustrate examples related to demodulation reference signals (DMRSs) in accordance with some embodiments. FIGS. 18-23 illustrate examples related to DMRSs and/or PT-RSs in accordance with some embodiments.

It should be noted that the examples shown in FIGS. 10-23 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 10-23. Although some of the elements shown in the examples of FIGS. 10-23 may be included in a 3GPP standard, 3GPP LTE standard, NR standard, 5G standard and/or other standard, embodiments are not limited to usage of such elements that are included in standards.

In some embodiments, to improve cell search and system information acquisition performance of machine type communication (MTC) devices, a resynchronization signal (RSS) included in LTE Rel-15/16 may be used. In some embodiments, RSS configuration information may be provided in system information block (SIB) and/or RRC signaling. The frequency location(s) and transmission duration of the RSS can be configured by SIB and/or RRC signaling. In some embodiments, the UE 102 may assume that the transmission of RSS in subframes (2n, 2n+1) is from the same antenna port at least when transmit diversity (TxD) is used.

In some embodiments, the periodicity of the first subframe of RSS may be configurable to 160, 320, 640 and 1280 ms. In some embodiments, the time offset of each RSS burst may be configurable as well. In some embodiments, the RSS base sequence duration may be down selected from either 1 or 11 symbols. In some embodiments, to aid the UE 102 to determine whether the detected RSS is transmitted from the current cell, the RSS may provide at least partial information about physical cell identity (PCI). Currently, the RSS bandwidth is assumed to be 2 PRBs. In some embodiments, the 2-PRB sequence may include repetitions in the frequency domain of 1-PRB sequence, although the scope of embodiments is not limited in this respect.

In some embodiments, an RSS for new radio (NR) systems may be based on highly configurable design methods.

In some embodiments, configurable RSS transmission schemes may be used to support different coverage and UE 102 power saving requirements. In some embodiments, the RSS may be comprised of two segments, namely, primary RSS (PRSS) and secondary RSS (SRSS). And PRSS and SRSS can jointly provide the information about PCI. In some embodiments, one or more of the following aspects can be configured and signaled by SIB or dedicated RRC signaling: configurable RSS frequency allocation, bandwidth and periodicity; configurable PRSS time duration and starting OFDM symbol in PRSS slot; configurable PRSS base sequence length; configurable time duration for PRSS transmission with quasi-collocated antenna port; configurable SRSS time duration and starting OFDM symbol in SRSS slot; configurable SRSS base sequence length; configurable time duration for SRSS transmission with quasi-collocated antenna port; and/or other.

In some embodiments, one or more techniques may enable different configurations for RSS transmission which can be used for various RSS coverage and UE 102 power saving requirements. As a result, trade-off among network flexibility and UE 102 implementation complexity can be achieved, in some cases.

In some embodiments, a configurable RSS design for NR may be used. A non-limiting example 1000 is shown in FIG. 10. As shown in the example 1000 in FIG. 10, the configurable RSS may include a periodic transmission of RSS bursts, and each RSS burst may be comprised of two segments, namely primary-RSS (PRSS) and secondary-RSS (SRSS). Similar to PSS and SSS in NR, PRSS and SRSS can provide the group ID of physical cell ID (PCI), and PCI, respectively. Moreover, to support flexible radio resource allocation, the following configurable aspects can be used for RSS transmission.

In some embodiments, configurable frequency allocation, bandwidth and/or periodicity may be used. The frequency allocation, bandwidth and/or periodicity of RSS can be configured by SIB, dedicated RRC signaling and/or other signaling/element(s). In some embodiments, the frequency allocation may define the starting physical resource block of RSS in the respective bandwidth part of the corresponding serving cell. In some embodiments, the bandwidth (such as $N_{RSS}{}^{RB}$) of RSS may be signaled from a set of supported values of RSS BW. For example, the set of supported RSS BW can include 2, 4 and 6 PRBs.

In some embodiments, configurable PRSS time duration and/or starting OFDM symbol in PRSS slot may be used. In some embodiments, the time duration of PRSS in terms of number of slots can be configured by SIB, dedicated RRC signaling and/or other signaling/element(s). In a non-limiting example, the number of continuous slots for PRSS can be 4, 8, 16, 32, 48 and 64 to support a variety of target coverages. In some embodiments, the starting OFDM symbol of PRSS in each PRSS slot can be also configured. For example, given the OFDM symbol index in a slot ranging from 0 to 13, the starting OFDM symbol of PRSS can be 0, 1 and 2.

In some embodiments, a configurable PRSS base sequence length may be used. In some embodiments, the PRSS base sequence can be generated by using a technique that may be similar to a technique that may be used for an NR PSS, although the scope of embodiments is not limited in this respect. For instance, the following the method can be used to generate the PRSS base sequence.

$d_{PRSS}(n) = 1 - 2 \times (m)$ $m = (n + 43 N_{ID}^{(2)}) \bmod N_{PRSS}$ $0 \le n < N_{PRSS}$ $x(i+7) = (x(i+4) + x(i)) \bmod 2$ $[x(6) x(5) x(4) x(3) x(2) x(1) x(0)] = [1\ 1\ 1\ 0\ 1\ 1\ 0]$ In the above, $N_{PRSS} = 12 N_{RSS}{}^{RB} N_{PRSS}{}^{OS}$ may define the PRSS base sequence length, and $N_{PRSS}{}^{OS}$ may denote the number of OFDM symbols of PRSS base sequence. The parameter $N_{PRSS}{}^{OS}$ can be signaled in SIB, dedicated RRC signaling and/or other signaling/element(s). In addition, $N_{ID}^{(2)} = 0, 1, 2$ may indicate the group ID of PCI conveyed by PRSS.

In FIG. 10, a non-limiting example 1050 of a PRSS base sequence mapping in a PRSS slot is shown. As shown in 1050 in FIG. 10, the PRSS base sequence is repeatedly mapped in first frequency and then time order into each PRSS slot. For the last PRSS base sequence repetition, if the whole PRSS base sequence cannot be mapped to the slot, the shortened PRSS base sequence may be mapped to the available resource elements in the PRSS slot.

In some embodiments, a configurable time duration for PRSS transmission with quasi-collocated antenna port may be used. In some embodiments, to support transmit diversity, e.g., antenna switching or pre-coder cycling, a time duration for QCLed PRSS transmission may be signaled by SIB, dedicated RRC signaling and/or other signaling/element(s). In some cases, to allow the coherent combining gain from whole PRSS base sequence, the time duration of QCLed PRSS transmission can be one or several times than that of PRSS base sequence. In the example 1050 shown in FIG. 10, if the network signals that the QCLed PRSS transmission duration is to be 2 times a duration of PRSS base sequence, this may allow the UE 102 to perform coherent combining over up to two PRSS base sequence repetitions, in some cases.

In some embodiments, configurable SRSS time duration and/or starting OFDM symbol in SRSS slot may be used. In some embodiments, the time duration of SRSS in terms of number of slots can be configured by SIB or dedicated RRC signaling and/or other signaling/element(s). In a non-limiting example, the number of continuous slots for SRSS can be 1, 2, and 4. In some embodiments, the starting OFDM symbol of SRSS in each SRSS slot can be also configured or may be the same as that of PRSS.

In some embodiments, a configurable SRSS base sequence length may be used. In some embodiments, the SRSS base sequence can be generated using a technique that may be similar to a technique used to generate an NR SSS. In some embodiments, the following method can be used to generate the SRSS base sequence.

$d_{SRSS}(n) = [1 - 2x_0((n + m_0) \bmod N_{SRSS})][1 - 2x_1((n + m_1) \bmod N_{SRSS})]$ $m_0 = 15 \left\lfloor \dfrac{N_{ID}^{(1)}}{112} \right\rfloor + 5 N_{ID}^{(2)}$ $m_1 = N_{ID}^{(1)} \bmod 112$ $0 \le n < N_{SRSS}$ $x_0(i+7) = (x_0(i+4) + x_0(i)) \bmod 2$ $x_1(i+7) = (x_1(i+1) + x_1(i)) \bmod 2$ $[x_0(6)\ x_0(5)\ x_0(4)\ x_0(3)\ x_0(2)\ x_0(1)\ x_0(0)] = [0\ 0\ 0\ 0\ 0\ 0\ 1]$ $[x_1(6)\ x_1(5)\ x_1(4)\ x_1(3)\ x_1(2)\ x_1(1)\ x_1(0)] = [0\ 0\ 0\ 0\ 0\ 0\ 1]$ In the above, $N_{SRSS} = 12 N_{RSS}{}^{RB} N_{SRSS}{}^{OS}$ may define the SRSS base sequence length, and $N_{SRSS}{}^{OS}$ may denote the number of OFDM symbols of the SRSS base sequence. In some embodiments, the parameter $N_{SRSS}{}^{OS}$ may be the same as or different than $N_{PRSS}{}^{OS}$ signaled in SIB or dedicated RRC signaling. In some embodiments, the parameters $N_{ID}^{(1)} = 0, 1, \ldots 335$ and $N_{ID}^{(2)}$ may jointly determine the PCI, which may be similar to a technique used in NR, in some cases.

In some embodiments, similar to PRSS mapping to PRSS slot, the last SRSS base sequence may also need to be shortened in order to be mapped to SRSS slot.

In some embodiments, a configurable time duration for SRSS transmission with quasi-collocated antenna port may be used. In some embodiments, similar to transmit diversity used for PRSS, the time duration for QCLed SRSS transmission can be the same as that for PRSS, or separately signaled by SIB, dedicated RRC signaling and/or other signaling/element(s).

In some embodiments, a configurable RSS may include a periodic transmission of RSS bursts, and each RSS burst may comprise two segments—primary-RSS (PRSS) and secondary-RSS (SRSS). In some embodiments, PRSS and SRSS can jointly provide the physical cell ID.

In some embodiments, a 5G system may be deployed in high band, which could be up to 100 GHz, where phase noise impact could be quite significant. The phase noise could cause different phase shift in time domain. In frequency domain, a common phase error (CPE) for all subcarriers could be dominant. Phase Tracking Reference Signal (PT-RS) may be used to compensate the phase shift. Further to enhance the coverage, transmission (Tx) signal for both DL and UL may be generated based on a waveform with low PAPR. Then How to transmit the PT-RS with a low PAPR waveform could be one issue.

In Rel-15, DFT-s-OFDM waveform can be applied to uplink, which can be used for single-layer transmission only. Then the PT-RS and PUSCH are multiplexed in Time Division Multiplexing (TDM) manner as shown in the example 1100 in FIG. 11. However for DFT-s-OFDM waveform, how to transmit the PT-RS for multi-layer transmission could be one issue.

In addition, in some band, pure Single Carrier (SC) waveform may be applied. Then how to transmit the PT-RS for this waveform could be another issue. In some embodiments, methods for phase tracking in DFT-s-OFDM and SC waveform may be used, including: PT-RS and PDSCH/PUSCH multiplexing for multi-layer transmission in DFT-s-OFDM waveform; PT-RS and PDSCH/PUSCH multiplexing for SC waveform; and/or other(s).

In some embodiments, for DFT-s-OFDM waveform and SC waveform, PT-RS and PDSCH/PUSCH can be multiplexed in Time Division Multiplexing (TDM) manner. For DFT-s-OFDM waveform, PT-RS and PDSCH/PUSCH are multiplexed before DFT operation. Since the phase shift caused by phase noise could be common for all antenna ports (APs), the number of PT-RS antenna ports could be smaller than DMRS antenna ports. The following embodiments provide options to multiplex PT-RS and PDSCH/PUSCH for high rank transmission (rank>1).

In some embodiments, the number of PT-RS APs are the same as that of DMRS APs. The PT-RS can be multiplexed in some symbols with uniform or non-uniform manner, where in one option the same offsets should be applied in different APs (layers), and in another option different offsets can be applied in different APs (layers). The offset can be determined by PT-RS AP index. In FIG. 12, an example 1200 for PT-RS multiplexing with the same offset across APs is illustrated. In FIG. 12, another example 1250 for PT-RS multiplexing with AP specific offset is illustrated.

In some embodiments, the number of PT-RS APs could be smaller than that of DMRS APs. Then for the AP without PT-RS, in one option the symbols used for PT-RS in other APs shall not be used for PDSCH/PUSCH as shown in the example 1300 in FIG. 13. In another option, the symbols used for PT-RS can be used for PDSCH/PUSCH as shown in the example 1350 in FIG. 13.

In some embodiments, the AP(s) in which PT-RS should be transmitted can be pre-defined, e.g. lowest antenna port in a DMRS ports group, wherein the APs in a DMRS ports group can be configured by higher layer signaling and/or Downlink Control Information (DCI). Alternatively the AP(s) in which PT-RS should be transmitted can be dynamically changed. In one option it can be configured by higher layer signaling and/or DCI; in another option, it can be determined by the Modulation and Coding Scheme (MCS) for a codeword, e.g. it is mapped to the layer with largest MCS.

For the option 1350 shown in FIG. 13, the number of symbols for data channel in different layers could be different. Denote number of symbols for the layer without PT-RS is N and number of symbols for the PT-RS in a layer is K, as shown in 1350 in FIG. 13, there are N-K symbols for data channel in layer 1 and N symbols for data channel in layer 2.

In some embodiments, one or more of the following options may be used (which may handle the symbol imbalance issue, in some cases). In one option, for the symbols used for PT-RS in the AP(s) with PT-RS, PDSCH/PUSCH symbols mapped to the same symbols index. In another option, the layers with PT-RS should be mapped to one codeword and the other layers should be mapped to another codeword. In another option, the codeword to layer mapping support symbol-imbalance mapping (for example, as shown in 1350 in FIG. 13) given there are X modulated symbols mapped to 2 layers, where N-K symbols are mapped to layer 1 and the other N symbols are mapped to layer 2 and X equals to 2N-K.

In some embodiments, for the AP with PT-RS, the PT-RS group size may be fixed, e.g. 1, 2 or 4, or configured by higher layer signaling per subcarrier spacing or for all subcarrier spacing. Alternatively the PT-RS group size may be determined by bandwidth, and/or MCS, and/or subcarrier spacing, and/or number of symbols within a data channel transmission duration or interval. The table below illustrates one example for the PT-RS group size selection.

| MCS | PT-RS group size |
| --- | --- |
| MCS < MCS0 | No PT-RS |
| MCS0 <= MCS < MCS1 | 2 |
| MCS1 <= MCS < MCS2 | 4 |

In some embodiments, the threshold can be configured by higher layer signaling and/or predefined and/or based on UE 102 capability.

In some embodiments, for the AP with PT-RS, the number of PT-RS group within a data channel transmission duration or interval may be fixed, e.g. 2, 4, 8, or configured by higher layer signaling per subcarrier spacing or for all subcarrier spacing. Alternatively, it may be determined by bandwidth, and/or MCS, and/or subcarrier spacing, and/or number of symbols within a data channel transmission duration or interval. The table below illustrates one example for number of PT-RS group selection.

| Number of symbols within a data channel duration or interval | Number of PT-RS groups |
| --- | --- |
| M < M0 | No PT-RS |
| M0 <= M < M1 | 2 |
| M1 <= M < M2 | 4 |
| M2 <= M < M3 | 8 |

In some embodiments, the threshold can be configured by higher layer signaling and/or predefined and/or based on UE 102 capability.

In some embodiments, in one PT-RS AP, the PT-RS sequence can be generated based on Pseudo-Noise (PN) sequence, which is initialized by subset or all the parameters including higher layer configured scramble ID, timing information and AP index. Further different Orthogonal Cover Code (OCC) may be applied to different PT-RS APs. In one example, the OCC is applied to each PT-RS group. When PT-RS group size is 2, the candidate OCC code could be [1 1] or [1−1]. Further the PT-RS signal may be based on QPSK or pi/2 BPSK, where for each PT-RS symbol, its base sequence may be determined by PT-RS symbol index within a data channel transmission duration and/or PT-RS sample index within all PT-RS samples within a data channel transmission duration.

In some embodiments, the UE 102 may transmit or receive phase tracking reference signal (PT-RS) based on low Peak-to-Average Power Ratio (PAPR) waveform. In some embodiments, the low PAPR waveform may be DFT-s-OFDM waveform or pure single carrier (SC) waveform. In some embodiments, the number of PT-RS antenna ports (APs) may be the same as that of DMRS APs. In some embodiments, PT-RS can be multiplexed in some symbols in uniform or non-uniform manner with PDSCH/PUSCH. In some embodiments, same multiplexing offset may be applied in different PT-RS APs. In some embodiments, different multiplexing offsets may be applied in different PT-RS APs. In some embodiments, the number of PT-RS APs could be smaller than that of DMRS APs. In some embodiments, for the AP without PT-RS, the symbols used for PT-RS in other APs shall not be used for PDSCH/PUSCH. In some embodiments, for the AP without PT-RS, the symbols used for PT-RS in other APs may be used for PDSCH/PUSCH. In some embodiments, the AP(s) in which PT-RS should be transmitted can be pre-defined. In some embodiments, the AP(s) in which PT-RS should be transmitted can be dynamically changed. In some embodiments, the AP(s) index can be configured by higher layer signaling and/or Downlink Control Information (DCI). In some embodiments, the AP(s) index can be determined by the Modulation and Coding Scheme (MCS) for a codeword if multiple codewords are used. In some embodiments, for the symbols used for PT-RS in the AP(s) with PT-RS, PDSCH/PUSCH symbols mapped to the same symbols index are punctured. In some embodiments, the layers with PT-RS should be mapped to one codeword and the other layers should be mapped to another codeword. In some embodiments, the codeword to layer mapping support symbol-imbalance mapping, where the number of symbols in the layer with PT-RS should be smaller than that in the layer without PT-RS. In some embodiments, for the AP with PT-RS, the PT-RS group size may be fixed or configured by higher layer signaling per subcarrier spacing or for all subcarrier spacing. In some embodiments, the PT-RS group size may be determined by bandwidth, and/or MCS, and/or subcarrier spacing, and/or number of symbols within a data channel transmission duration or interval. In some embodiments, for the AP with PT-RS, the number of PT-RS group within a data channel transmission duration or interval may be fixed or configured by higher layer signaling per subcarrier spacing or for all subcarrier spacing. In some embodiments, for the AP with PT-RS, the number of PT-RS group within a data channel transmission duration or interval may be determined by bandwidth, and/or MCS, and/or subcarrier spacing, and/or number of symbols within a data channel transmission duration or interval. In some embodiments, in one PT-RS AP, the PT-RS sequence can be generated based on Pseudo-Noise (PN) sequence, which is initialized by subset or all the parameters including higher layer configured scramble ID, timing information and AP index. In some embodiments, different Orthogonal Cover Code (OCC) may be applied to different PT-RS APs. In some embodiments, the PT-RS signal may be based on QPSK or pi/2 BPSK, where for each PT-RS symbol, its base sequence may be determined by PT-RS symbol index within a data channel transmission duration and/or PT-RS sample index within all PT-RS samples within a data channel transmission duration.

In some cases, co-channel interference is one of the major technical issues for sidelink based V2V communication. This problem becomes even more challenging if demodulation reference signals (DMRS) used for PSCCH and PSSCH channel are not properly designed and selected. In particular, if two or more UEs 102/transmitters occupying the same spectrum resource use the same reference signals then at the receiver side the demodulation performance for any of the transmitting UEs 102 may degrade significantly due to a composite channel seen at the receiver side. In order to avoid this problem each transmitter needs to carefully select its own DMRS sequence for transmission. If the transmitter autonomously selects the DMRS sequence or the DMRS sequence is assigned by the gNB, the receiver UE may need to blindly detect multiple DMRS signal hypotheses. This puts a limitation on maximum number of possible DMRS sequences to keep reasonable complexity at the receiver side.

In some embodiments, techniques may be related to design of DMRS signals and the UE 102 behavior for DMRS selection to improve sidelink V2V demodulation performance for both PSCCH and PSSCH channels.

In some cases, solutions applied in LTE V2V system assumes a randomization of the cyclic shift of DMRS is applied to the PSCCH transmission. In particular, 4 DMRS cyclic shift values are defined in specification from which UE can randomly pick the one for each PSCCH transmission. If a UE 102 supports transmit diversity or spatial multiplexing, it may employ a different cyclic shift for each antenna port. Besides using different cyclic shifts, the rest of the DMRS sequence generation procedure is common across all UEs 102. The clear drawback of this is that two UEs 102 occupying the same resource can select the same cyclic shift value with probability ¼. It should be noted that the amount of cyclic shift values is limited, otherwise the amount of DMRS blind detections per PSCCH resource can be extremely high. Therefore there is a tradeoff in demodulation performance and DMRS blind detection complexity for PSCCH demodulation. In the case of PSSCH, the DMRS signal generation is a function of the PSCCH content (payload). The drawback of this approach is that if the PSCCH content happens to be the same, an identical PSSCH DMRS sequence will be generated. Given that the eV2X applications require a higher reliability, the DMRS generation procedure needs to be enhanced to avoid the technical limitations of the existing procedure.

In some cases, disadvantages of some solutions may include one or more of the following: high probability to select the same DMRS generation sequence for PSCCH and PSSCH transmissions that can significantly degrade demodulation performance at system level; large implementation overhead for the generation of the PSCCH and PSSCH DMRS signals; low demodulation performance at high speed for high order modulations; high probability to use the same PSCCH DMRS signals parameters; even higher probability to select the same DMRS parameters by two UEs 102 if multi-layer transmission schemes are employed; and/or other(s).

In some embodiments, technique(s) for a sidelink DMRS sequence generation for PSCCH and PSSCH that is suitable for NR sidelink V2V communications may be used. Advantages of such technique(s) may include one or more of the following, in some cases: improved demodulation performance at high speeds to enable support of high order modulation and MIMO transmission schemes; reduced DMRS overhead for V2X services; lower probability of having composite channel in the target V2V communication range; optimized for implementation of advanced receivers with IS/IC capabilities; and/or other(s).

In some embodiments, one or more of the following may be used: the DMRS sequence generation is a function of UE 102 (transmitter) location information or some other higher layer information; optimized DMRS pattern per PRB; new procedures for generation of the PSCCH/PSSCH DMRS signal sequences; enhanced UE 102 behavior for the PSCCH/PSSCH DMRS signal selection.

In some embodiments, one or more of the following may be realized by embodiments described herein: improvement of V2V demodulation performance of future Cellular-V2X systems supporting advanced use cases; improvement of spectrum efficiency and reliability of future Cellular-V2X communication improving advanced safety and non-safety related use cases; usage in modems for vehicular telematics control units (TCUs) which may be for automotive OEMs; and/or other(s).

Several terms and definitions that may be used within are described below. In some embodiments, UE location information may include information that includes at least one component or any combination of geographical coordinates relative or absolute, velocity vector information including magnitude and direction, UE 102 presence in certain geographical area/zone/road lane/road and their derivatives or any function depending on the above arguments. In some embodiments, UE sensing information may include information derived by UE 102 receiver from detected sidelink transmissions (PSCCH and PSSCH) from other UEs and used to determine UE transmission settings. in some embodiments, DMRS parameters may include one or more physical layer or higher layer signaling parameters related to generation of DMRS sequences or construction of DMRS signals comprising at least one component or theirs combination such as cyclic shift, resource element mapping pattern, parameters to derive seed used to initialize DMRS sequence generator and produce DMRS sequence, antenna port(s), orthogonal cover codes in time or frequency, spreading codes, etc. in some embodiments, UE higher layers information may include information or data that is passed to the physical layer from higher layer protocols, including from the V2X applications, facilities, transport or network layers.

In some embodiments, demodulation reference signal for PUSCH may be used. In some embodiments, the PUSCH demodulation reference signal sequence $r_{PUSCH}^{(\lambda)}(\cdot)$ associated with layer $\lambda \in \{0,1,\ldots,\upsilon-1\}$ is defined by –

$$r_{PUSCH}^{(\lambda)}(m \cdot M_{sc}^{RS}-n)=w^{(\lambda)}(m)r_{u,v}^{(\alpha_\lambda)}(n)$$

wherein
m=0,1
n=0 ... $M_{sc}^{RS}-1$
and the reference signal sequence $r_{u,v}^{(\alpha)}(n)$ is defined by a cyclic shift a of a base sequence $\bar{r}_{u,v}(n)$ according to $$r_{u,v}^{(\alpha)}(n)=e^{j\alpha n}\bar{r}_{u,v}(n),\ 0 \le n < M_{sc}^{RS}$$

wherein $M_{sc}^{RS}=mN_{sc}^{RB}$ is the length of the reference signal sequence and $1 \le m \le N_{RB}^{max,UL}$. Multiple reference signal sequences are defined from a single base sequence through different values of $\alpha$. Details on how the base sequence $\bar{r}_{u,v}(n)$ is generated are given in subclause 5.5.1 of TS 36.211.

Figure 14:
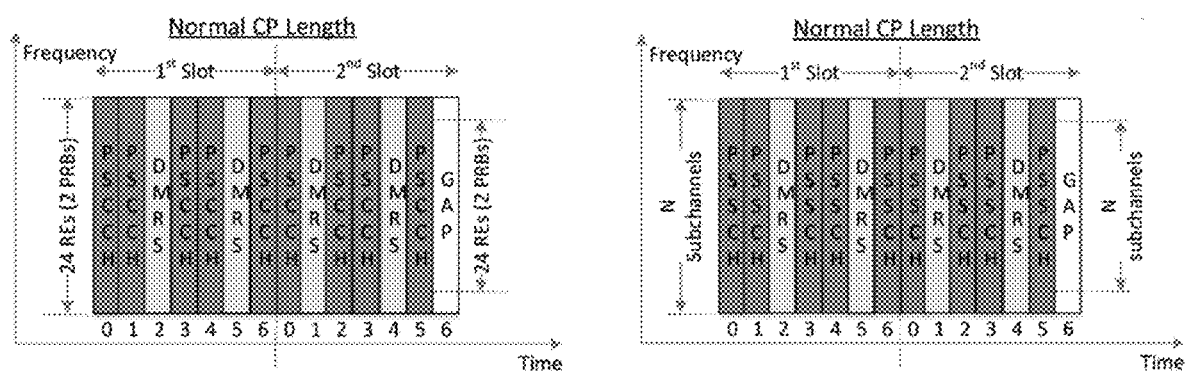
FIG. 14 illustrates examples related to demodulation reference signals (DMRSs) in accordance with some embodiments.

For both PSCCH and PSSCH, 4 symbols are transmitted per subframe with indexes 2, 5, 8 and 11 as depicted in FIG. 14.

A random cyclic shift of 0, 3, 6 or 9 samples is selected for each PSCCH transmission. The parameters for the generation of PSCCH DMRS are a redefinition of PUSCH DMRS and provided in the table below.

| Parameter in clause 5.5.2.1 of TS 36.211 | | PSCCH Sidelink transmission modes 3 and 4 |
|---|---|---|
| Group hopping | | disabled |
| | $n_{ID}^{RS}$ | — |
| | $n_s$ | — |
| | $f_{ss}$ | 8 |
| Sequence hopping | | disabled |
| Cyclic shift | $n_{cs,\lambda}$ | {0, 3, 6, 9} |
| Orthogonal sequence | $[w^{\lambda}(\cdot)]$ | [+1 +1 +1 +1] |
| Reference signal length | $M_{sc}^{RS}$ | $M_{sc}^{PSCCH}$ |
| Number of layers | $\upsilon$ | 1 |
| Number of antenna ports | P | 1 |

For PSSCH the sequence is randomized based on a decimal representation ($n_{ID}^X$) of the PSCCH CRC field. The pseudo-random sequence generator is initialized at the start of each slot fulfilling $n_{ss}^{PSSCH}=0$. The parameters for the generation of PSSCH DMRS are a redefinition of PUSCH DMRS and provided in the table below.

| Parameter in clause 5.5.2.1 of TS 36.211 | | PSSCH Sidelink transmission modes 3 and 4 |
|---|---|---|
| Group hopping | | enabled |
| | $n_{ID}^{RS}$ | $n_{ID}^X$ |
| | $n_s$ | $2n_{ss}^{PSSCH}$ first DM-RS symbol in a slot $2n_{ss}^{PSSCH}+1$ second DM-RS symbol in a slot |
| | $f_{ss}$ | $[n_{ID}^X/16]\bmod 30$ |
| Sequence hopping | | disabled |
| Cyclic shift | $n_{cs,\lambda}$ | $[n_{ID}^X/2]\bmod 8$ |
| Orthogonal sequence | $[w^{\lambda}(\cdot)]$ | [+1 +1 +1 +1] if $n_{ID}^X \bmod 2=0$ [+1 −1 +1 −1] if $n_{ID}^X \bmod 2=1$ |
| Reference signal length | $M_{sc}^{RS}$ | $M_{sc}^{PSSCH}$ |
| Number of layers | $\upsilon$ | 1 |
| Number of antenna ports | P | 1 |

There are two types of DMRS in NR when the waveform CP-OFDM is employed. DMRS Type 1 (with Mapping Type A) is depicted in 1500 in FIG. 15, wherein two possible allocations in a half-slot are represented. In the left half-slot, a DMRS of one symbol is shown (one symbol front-loaded DMRS), where two DMRS sequences are mapped to resource elements in an interleaved or comb mode. For each of the sequences there are two possible cyclic shifts to generate them. In the second half-slot shown (two symbol front-loaded DMRS), two DMRS symbols are employed also with two sequences in comb mode and a time domain orthogonal cover code is applied to the two symbols, i.e. {1 1} and {1−1}.

Figure 15:
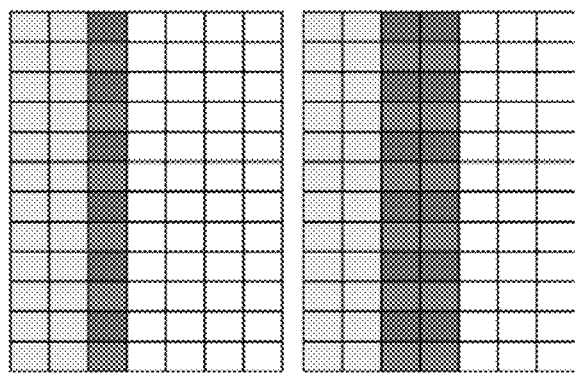
FIG. 15 illustrates examples related to DMRSs in accordance with some embodiments.
Figure 15:
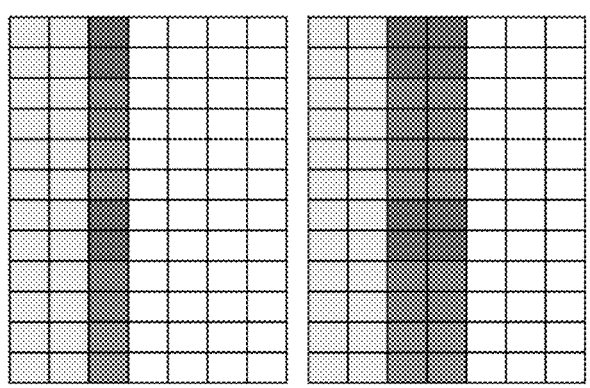

Type 2 DMRS (with Mapping Type A) is depicted in 1550 in FIG. 15, wherein also two possible allocations inside a half-slot are represented. In the left half-slot again one symbol is used for DMRS (one symbol front-loaded DMRS), however, now three sequences are multiplexed in frequency domain and occupy always pairs of resource elements, where orthogonal cover code is applied now in frequency domain. For the second half-slot shown, two symbols are used for DMRS (two symbol front-loaded DMRS) and, in addition to what is done in the previous half-slot shown, a time domain orthogonal cover code is applied, similar to the second variant of Type 1.

The DMRS sequence is a length-31 Gold sequence for Type 1 and Type 2. The maximum number of front-loaded DMRS is RRC configured, however, a dynamic indication for the actual number of front-loaded DMRS is possible. DMRS can be multiplexed in the frequency domain with PDSCH/PUSCH.

For both Type 1 and Type 2, the DMRS start positions are the $3^{rd}$ or $4^{th}$ OFDM symbols in a slot for PDSCH/PUSCH Mapping Type A, or $1^{st}$ symbol in a slot for PDSCH/PUSCH Mapping Type B.

For PDSCH with mapping Type A and one symbol front-loaded DMRS, i.e. first DMRS sequence in $3^{rd}$ or $4^{th}$ symbol, one additional DMRS can be included in the $8^{th}$, $10^{th}$ or $12^{th}$ symbol; or two additional DMRS in $\{7^{th}, 10^{th}\}$ symbols or in $\{8^{th}, 12^{th}\}$ symbols. If the first DMRS is in the $3^{rd}$ symbol than three additional DMRS in $\{6^{th}, 9^{th}, 12^{th}\}$.

For PDSCH with mapping Type A and two symbol front-loaded DMRS, i.e. first DMRS sequence in 3rd or 4th symbol (second DMRS sequence in $4^{th}$ or $5^{th}$ symbol), two additional DMRS can be included in $\{9^{th}, 10^{th}\}$ of in the $\{11^{th}$ and $12^{th}\}$ symbols of the slot.

For PUSCH without frequency hopping DMRS the same additional DMRS configuration as in PDSCH is applied.

For DFT-s-OFDM waveform only the DMRS of Type 1 can be employed, i.e. one symbol composed by two combs with two cyclic shifts; or two symbols composed by two cyclic shifts and with the application of time domain orthogonal cover code. The same DMRS locations as for CP-OFDM are supported. DMRS cannot be multiplexed in frequency with PUSCH.

Techniques, operations and/or methods described in some embodiments herein may be applied to: 1) the DMRS sequence generation, 2) the DMRS signal construction parameters under the same generated sequence and/or 3) other. Some considerations include: for PSSCH we may enhance the procedure for both sequence generation and signal construction, given that PSCCH may assist in determination of parameters for PSSCH DMRS generation; for PSCCH we may have a single sequence generation or a few basic sequences but enhance signal construction, given that the complexity of PSCCH blind decoding should be reasonably low (e.g. ≤8-16 blind DMRS detections per resource); for an OFDMA waveform, $c_{init}$, $n_{SCID}$, $N_{ID}^{SCID}$ can be fixed to a predefined value(s); alternatively, pool specific values can be considered; and/or other.

In some embodiments, if transform precoding for PUSCH is not enabled, the sequence r(n) shall be generated according to $$r(n) = \frac{1}{\sqrt{2}}(1 - 2 \cdot c(2n)) + j\frac{1}{\sqrt{2}}(1 - 2 \cdot c(2n + 1))$$

wherein the pseudo-random sequence c(i) is defined in clause 5.2.1 of TS 38.211. The pseudo-random sequence generator shall be initialized with $c_{init}=(2^{17}(N_{symb}^{slot} n_{s,f}^{\mu} + l + 1)(2N_{ID}^{nSCID} + 1) + 2N_{ID}^{nSCID} + n_{SCID}) \mod 2^{31}$ wherein "l" is the OFDM symbol number within the slot, $n_{s,f}^{\mu}$ is the slot number within a frame, and $n_{SCID} \in \{0,1\}$ and $N_{ID}^{nSCID} \in \{0, 1, \ldots, 65535\}$ is given by the higher-layer parameter UL-DMRS-Scrambling-ID if provided and the PUSCH is not a msg3 PUSCH according to clause 8.3 in [5, TS 38.213]

$n_{SCID}=0$ and $N_{ID}^{nSCID}=N_{ID}^{cell}$ otherwise

In some embodiments, one or more enhancements for OFDMA waveform may be used. The following enhancements can be considered for DMRS sequence generation in the application to V2V sidelink communication using PSCCH and/or PSSCH. Some embodiments may relate to dependence of DMRS sequence generation parameters on UE location information. $c_{init}$—is a function of the UE location information; $c_{init}$—is a function of SL-DMRS-Scrambling-ID, which is a function of the UE location information and defined for scrambling of sidelink transmission; $c_{init}$—is a function of SL-Pool-ID, which designates sidelink pool ID, which itself is a function of the UE location information (e.g. zone/road/lane ID, etc.); $n_{SCID}$—is a function of the UE location information or is associated with the UE location information; $N_{ID}^{nSCID}$—is a function of the UE location information or is associated with the UE location information.

In some embodiments, there may be considerations on the utilization of UE location information for PSCCH/PSSCH DMRS sequence generation. Not all of the enhancements above utilizing UE location information may not necessarily be directly applicable to PSCCH channel given that those may significantly increase complexity of PSCCH DMRS blind detection. On the other hand, a coarsely quantized form of the UE location information (e.g. Zone/Pool-ID) can be used to derive a limited set of possible PSCCH DMRS generation sequences applicable for a given time instance (or time-frequency resource). The remaining part of the information (or full information) can be directly carried in the PSCCH content through SCI Format (e.g. encoded in the payload of SCI Format X) for PSSCH demodulation.

Some embodiments may be related to explicit signaling of parameters for PSSCH DMRS generation/demodulation in PSCCH (SCI Format X). In some embodiments, PSCCH represented by one or more of the SCI Formats (e.g. SCI Format X) may contain an explicit field set by the TX UE or implicitly encode information (e.g. using CRC scrambling, etc.) that is used for generation of PSSCH DMRS sequence or overall signal.

Some embodiments may be related to utilization of sensing based or random selection of PSCCH/PSSCH DMRS parameters. In the general case, the parameters used to generate DMRS can be derived using other principles (besides relying on using the location information). In particular, the DMRS parameters to be selected for transmission of PSCCH and PSSCH can be derived based on the UE sensing and resource selection procedure or randomly selected from a predefined set of parameters. One example of sensing based selection of the DMRS parameters is to determine, based on RX processing, which DMRS signal parameters are already in use by other UEs sharing the given resources and select another subset of the remaining DMRS parameters.

Some embodiments may be related to utilization of parameters derived from information provided by higher layer protocols. The DMRS parameters can be also selected for transmission of PSCCH and PSSCH based on information passed by higher layer protocols. One example is the UE kinematics/velocity or the application/service ID provided by the application/service layer. Another example is information coming from the facilities layer, where messages and data blocks from the application/service are encapsulated together with other vehicle and kinematics data. Another example is information coming from the transport or network layer, such as correlated with the port number or network address.

Some embodiments may be related to an SC-FDMA/DFT-S-OFDM Waveform. If transform precoding for PUSCH is enabled, the reference-signal sequence r(n) shall be generated according to $$r(n) = r_{u,v}^{(\alpha,\delta)}(n)$$

$$n = 0, 1, \ldots, M_{sc}^{PUSCH} - 1$$

wherein $r_{u,v}^{(\alpha,\delta)}(m)$ is with $\delta=1$ and $\alpha=0$ for a PUSCH transmission dynamically scheduled by DCI.

The sequence group $u=(f_{gh}+n_{ID}^{RS})\mod 30$ where $n_{ID}^{RS}$ is given by $n_{ID}^{RS}=n_{ID}^{PUSCH}$ if $n_{ID}^{PUSCH}$ is configured by the higher-layer parameter nPUSCH-Identity-Transform-precoding and the PUSCH is not a msg3 PUSCH according to clause 8.3 in [5, TS 38.213]

$n_{ID}^{RS}=n_{ID}^{cell}$ otherwise where $f^{gh}$ and the sequence number v are given by
if neither group, nor sequence hopping shall be used:

$$f_{gh}=0$$

$$v=0$$

if group hopping but not sequence hopping shall be used:

$$f_{gh}=(\Sigma_{m=0}^{7}2^m c(8(N_{symb}^{slot}n_{s,f}^{\mu}+1)m))\mod 30$$

$$v=0$$

wherein the pseudo-random sequence c(i) is defined by clause 5.2.1 and shall be initialized with $c_{init}=\lfloor n_{ID}^{RS}/30 \rfloor$ at the beginning of each radio frame.

If sequence hopping but not group hopping shall be used:

$$f_{gh}=0$$

$$v=\begin{cases} c(N_{symb}^{slot}n_{s,f}^{\mu}+l) & \text{if } M_{ZC} \geq 6N_{sc}^{RB} \\ 0 & \text{otherwise} \end{cases}$$

wherein the pseudo-random sequence c(i) is is defined by clause 5.2.1 and shall be initialized with $c_{init}=n_{ID}^{RS}$ at the beginning of each radio frame.

Some embodiments may be related to enhancements for SC-FDMA Waveform. The following enhancements can be considered for DMRS generation in application to V2V communication using PSCCH and PSSCH channels in case of SC-FDMA waveform. Some embodiments may be related to dependence of DMRS sequence generation parameters on UE location information: $c_{init}$ is a function of the UE location information; $c_{init}$ is a function of nSL-Identity-Transform-precoding, which is a function of the UE location information and defined in the information element for sidelink transmission configuration; $c_{init}$ is a function of SL-Pool-ID, which designates sidelink pool ID, which itself is a function of the UE location information (e.g. zone/road/lane ID, etc.); $n_{SCID}^{PUSCH}=n_{SCID}^{SL}$—is a function of the UE location information or is associated with the UE location information; $n_{ID}^{RS}$—is a function of the UE location information or is associated with the UE location information.

Some embodiments may be related to utilization of UE location information for PSCCH/PSSCH DMRS sequence generation. Not all of the enhancements above utilizing UE location information may necessarily be directly applicable to PSCCH channel given that those may significantly increase complexity of PSCCH DMRS blind detection. On the other hand, a coarsely quantized form of the UE location information (e.g. Zone/Pool-ID) can be used to derive a limited set of possible PSCCH DMRS generation sequences applicable for a given time instance (or time-frequency resource). The remaining part of the information (or full information) can be directly carried in the PSCCH content through SCI Format (e.g. encoded in the payload of SCI Format X) for PSSCH demodulation.

Some embodiments may be related to explicit signaling of parameters for PSSCH DMRS generation/demodulation in PSCCH (SCI Format X). In some embodiments, PSCCH represented by one or more of the SCI Formats (e.g. SCI Format X) may contain an explicit field set by the TX UE or implicitly encode information (e.g. using CRC scrambling, etc.) that is used for generation of PSSCH DMRS sequence or overall signal.

Some embodiments may be related to utilization of sensing based or random selection of PSCCH/PSSCH DMRS parameters. In the general case, the parameters used to generate DMRS can be derived using other principles (besides relying on using the location information). In particular, the DMRS parameters to be selected for transmission of PSCCH and PSSCH can be derived based on the UE sensing and resource selection procedure or randomly selected from a predefined set of parameters. One example of sensing based selection of the DMRS parameters is to determine, based on RX processing, which DMRS signal parameters are already in use by other UEs sharing the given resources and select another subset of the remaining DMRS parameters.

Some embodiments may be related to utilization of parameters derived from information provided by higher layer protocols. The DMRS parameters can be also selected for transmission of PSCCH and PSSCH based on information passed by higher layer protocols. One example is the UE kinematics/velocity or the application/service ID provided by the application/service layer. Another example is information coming from the facilities layer, where messages and data blocks from the application/service are encapsulated together with other vehicle and kinematics data. Another example is information coming from the transport or network layer, such as correlated with the port number or network address.

Some embodiments may be related to construction of DMRS signal. Some embodiments may be related to NR DMRS Design. The 3GPP NR cellular communication system allows very flexible configuration of the DMRS patterns. In particular, duration (single symbol DMRS or double symbol DMRS), configuration type (Type-1 or Type-2), number of additional DMRS symbols (0, 1, 2, 3), starting symbol position ($l_0$) and DMRS types (Type-A—symbol index l is defined relative to the start of the slot or Type-B—symbol index l is defined relative to the start of scheduled resources) are configurable. Specific parameters depend on number of symbols used for physical channel transmissions. In addition, DMRSs have parameters such as antenna ports (p), CDM group, $\Delta$-shift, orthogonal cover codes in frequency—$w_f$ (OCC-FDM), orthogonal cover codes in time—$w_t$ (OCC-TDM), that allow use of multiple antenna ports. Each antenna port can be used to carry one spatial layer of the transmitted. In case of configuration type-1 and single symbol DMRS, up to 4 antenna ports is supported; in case of configuration type-2 and single symbol DMRS, up to 6 antenna ports is supported; in case of configuration type-1 and double symbol DMRS, up to 8 antenna ports is supported; in case of configuration type-2 and double symbol DMRS, up to 12 antenna ports is supported.

In some embodiments, one or more enhancements can be considered in terms of DMRS signal parameters selection for V2V sidelink communication.

Some embodiments may be related to dependence of DMRS signal parameters on UE location information. Selection of RE Pattern, CDM group, $\Delta$, and orthogonal cover codes, cyclic shift may be done independently of DMRS sequence and may be a function of UE location information: selected CDM group(s)—is a function of UE location information or is a function of SL-Pool-ID(s), which designates sidelink resource pool ID, which itself is a function of UE location information (e.g. zone/road/lane ID, etc.); selected OCC(s) ($w_t$, $w_f$)—is a function of UE location information or is a function of SL-Pool-ID(s), which designates sidelink resource pool ID, which itself is a function of UE location information (e.g. zone/road/lane ID, etc.); selected RE mapping pattern(s)—is a function of UE location information or is a function of SL-Pool-ID(s), which designates sidelink resource pool ID, which itself is a function of UE location information (e.g. zone/road/lane ID, etc.); cyclic shift(s) ($\alpha_{CS}$)—is a function of UE location information or is a function of SL-Pool-ID(s), which designates sidelink resource pool ID, which itself is a function of UE location information (e.g. zone/road/lane ID, etc.).

Some embodiments may be related to dependence of DMRS signal parameters on higher layers information. Similar as above but depending on information passed by higher layers, such as kinematics and application identification.

Some embodiments may be related to dependence of DMRS signal parameters on Rx processing. The UE can select the DMRS signal parameters based on information obtained from Rx processing, especially when a unicast link should be established. The selection of the parameters can be dynamic and depends on the physical dynamics of the UE, and also on the dynamic of the application.

Figure 16:
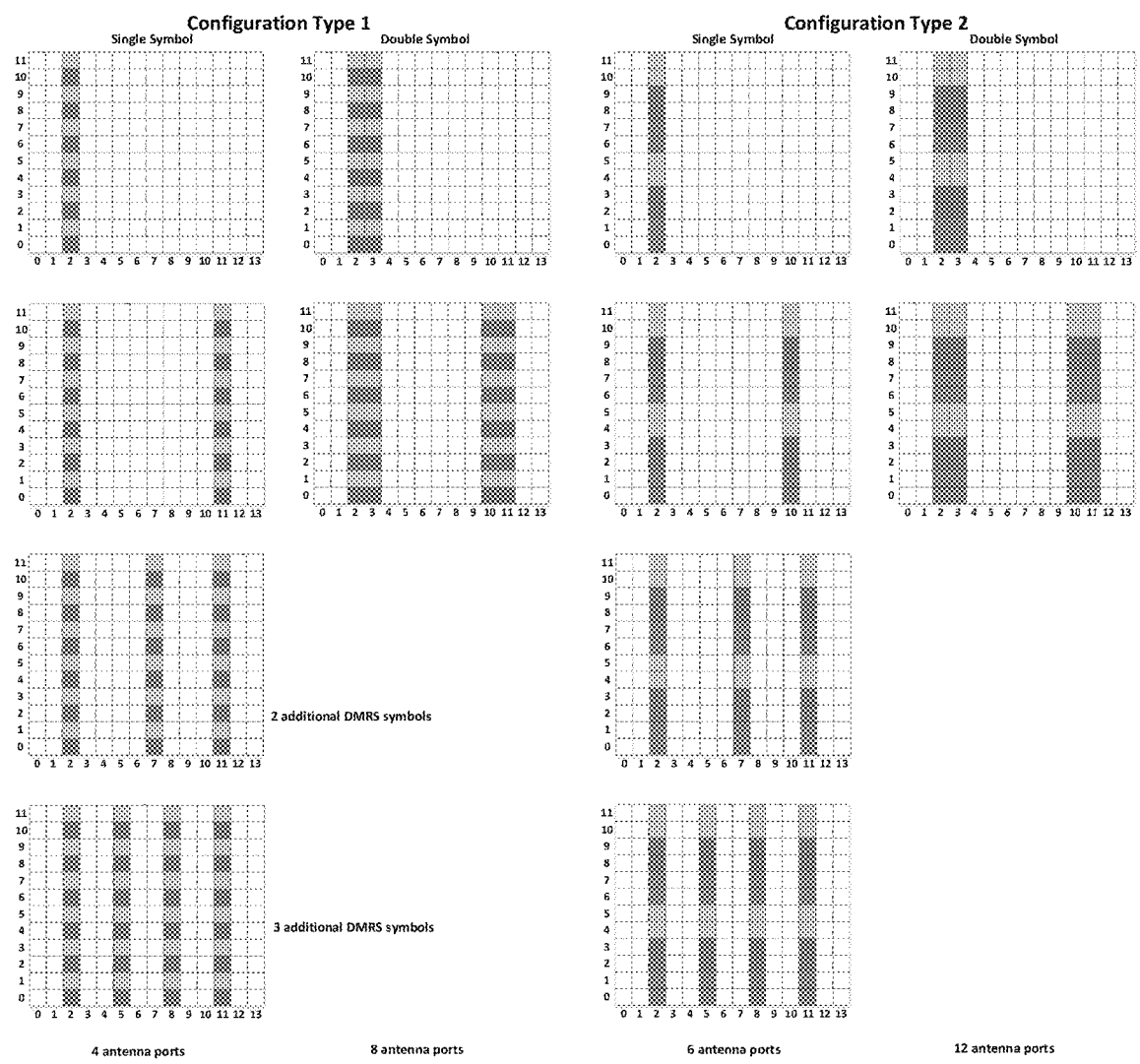
FIG. 16 illustrates examples related to DMRSs in accordance with some embodiments.

Some embodiments may be related to precoding and mapping to physical resources. In FIG. 16, 1600 shows PRB DMRS patterns assuming 1 PRB (12 Resource Elements—REs)×1 slot (14 symbols) allocation.

Some embodiments may be related to antenna port selection. It should be noted that, for LTE PSCCH there is a single AP defined but UE randomly selects CS for PSCCH transmission (i.e. multiple single AP has different OCCs represented by cyclic shift). In NR, AP determines OCC as well. Regarding what is the UE behaviour for antenna port selection, the following design options can be used: random, wherein the UE 102 randomly picks antenna ports for multi-layer transmission; sensing-based, wherein the UE 102 performs sensing to detect which ports are utilized by other UEs 102 on a selected PSCCH/PSSCH resource; gNB assignment of antenna port for gNB 105 controlled resource allocation mode; gNB 105 signals which antenna ports to use for sidelink PSCCH/PSSCH transmissions; predefined rules to determine which antenna ports to use; the UE 102 autonomously selects antenna ports for transmission of PSCCH/PSSCH based on location information or determines those as a function of UE ID, or other parameters; utilizing the following priority order—e.g. FDM>TDM>FDM/CDM>TDM/CDM (require sensing); and/or other(s).

Some embodiments may be related to a DMRS pattern. NR DMRS patterns may be further enhanced. The main drawback of the defined DMRS patterns is their vertical structure (i.e. whole symbol is allocated for DMRS but there are many symbols that do not have DMRS). For high speed V2X services, it is desirable to have DMRS in as many symbols as possible to improve channel estimation performance. Therefore DMRSs scattered in time and frequency can be alternatively proposed. The examples 1700 in FIG. 17 may be considered as an examples for eV2X communication. The examples 1750 in FIG. 17 may be considered as an examples for eV2X communication in case if AGC training symbol and TX-RX switching gaps are introduced.

In some embodiments, a method of sidelink signal transmission in a wide system bandwidth may comprise: transmission of Physical Sidelink Control Channel (PSCCH); transmission of Physical Sidelink Shared Channel (PSSCH); transmission of sidelink DMRS signals for demodulation of PSCCH/PSSCH channels or any other sidelink reference signals including sounding reference signals (SRS), phase tracking reference signals (PTRS), etc. In some embodiments, a method of sidelink reference signal transmission in a wide system bandwidth may comprise: reference signal sequence generation; reference signal construction parameters under the same or different generated sequences. In some embodiments, reference signal sequence generation may comprise sequence generation based on UE location information. In some embodiments, sequence generation based on UE location information may comprise parameters used to generate sequence using one of the following parameters: $c_{init}$—initialization seed of PRBS generator where is a function of the UE location information; $c_{init}$—is a function of SL-DMRS-Scrambling-ID, which is a function of the UE location information and defined for scrambling of sidelink transmission; $c_{init}$—is a function of SL-Pool-ID, which designates sidelink pool ID, which itself is a function of the UE location information (e.g. zone/road/lane ID, etc.); $n_{SCID}$—is a function of the UE location information or is associated with the UE location information; $N_{ID}^{SCID}$—is a function of the UE location information or is associated with the UE location information.

In some embodiments, sequence generation may comprise sequence generation based on higher layer information (network address, transport port number, application ID, message or packed traffic parameters, etc.); sequence generation dependent on payload information of PSCCH channel. In some embodiments, reference signal construction parameters under the same or different generated sequences may comprise: determination of parameters depending on UE location information; determination of parameters depending on higher layer information; determination of parameters depending on sensing and receiver processing information; determination of parameters depending on random selection. In some embodiments, reference signal construction parameters under the same or different generated sequences, may comprise dependence of reference signal parameters on UE location information; selection of RE Pattern, CDM group, A, and orthogonal cover codes, cyclic shift may be done independently of DMRS sequence and may be a function of UE location information: antenna Port index—is a function of UE location information or is a function of SL-Pool-ID(s), which designates sidelink resource pool ID, which itself is a function of UE location information (e.g. zone/road/lane ID, etc.), selected CDM group(s)—is a function of UE location information or is a function of SL-Pool-ID(s), which designates sidelink resource pool ID, which itself is a function of UE location information (e.g. zone/road/lane ID, etc.), selected OCC(s) (wt, wf)—is a function of UE location information or is a function of SL-Pool-ID(s), which designates sidelink resource pool ID, which itself is a function of UE location information (e.g. zone/road/lane ID, etc.), selected RE mapping pattern(s)—is a function of UE location information or is a function of SL-Pool-ID(s), which designates sidelink resource pool ID, which itself is a function of UE location information (e.g. zone/road/lane ID, etc.), cyclic shift(s) (aCS)—is a function of UE location information or is a function of SL-Pool-ID(s), which designates sidelink resource pool ID, which itself is a function of UE location information (e.g. zone/road/lane ID, etc.).

In some embodiments, determination of parameters depending on sensing and receiver processing information for reference signal construction comprises: antenna port index, selected CDM group(s), selected OCC(s) (wt, wf), selected RE mapping pattern(s), cyclic shift(s) (aCS). In some embodiments, determination of parameters based on random selection comprises: antenna port index, selected CDM group(s), selected OCC(s) (wt, wf), selected RE mapping pattern(s), cyclic shift(s) ($\alpha$CS).

Figure 17:
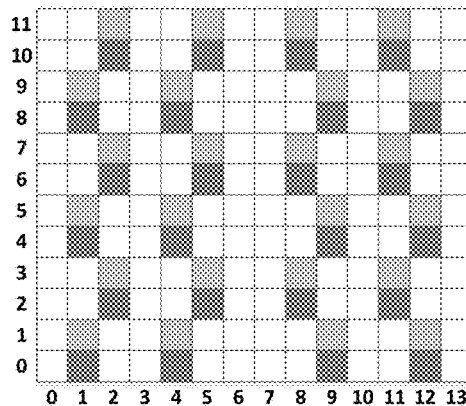
FIG. 17 illustrates examples related to DMRSs in accordance with some embodiments.
Figure 17:
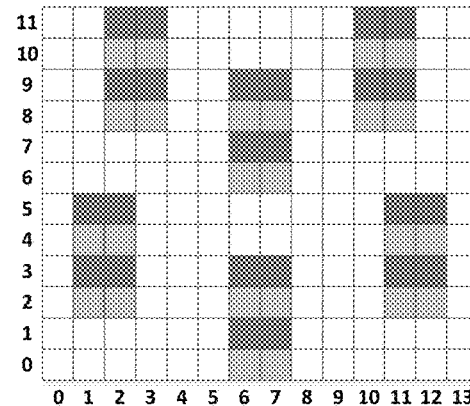
Figure 17:
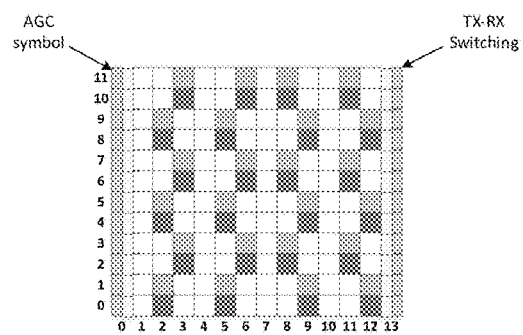
Figure 17:
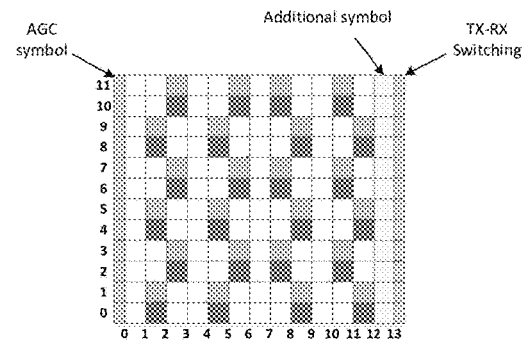
Figure 18:
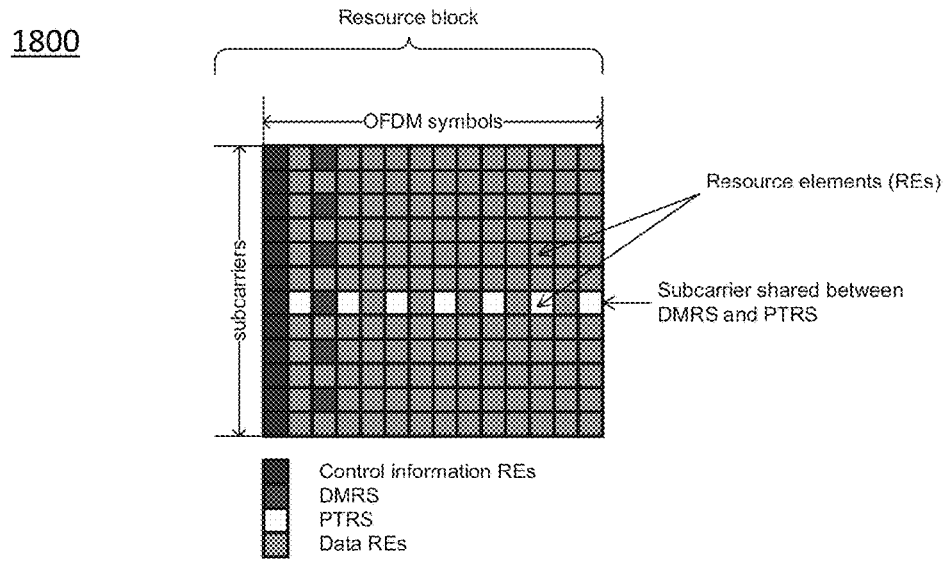
FIG. 18 illustrates examples related to DMRSs and/or PT-RSs in accordance with some embodiments.
Figure 19:
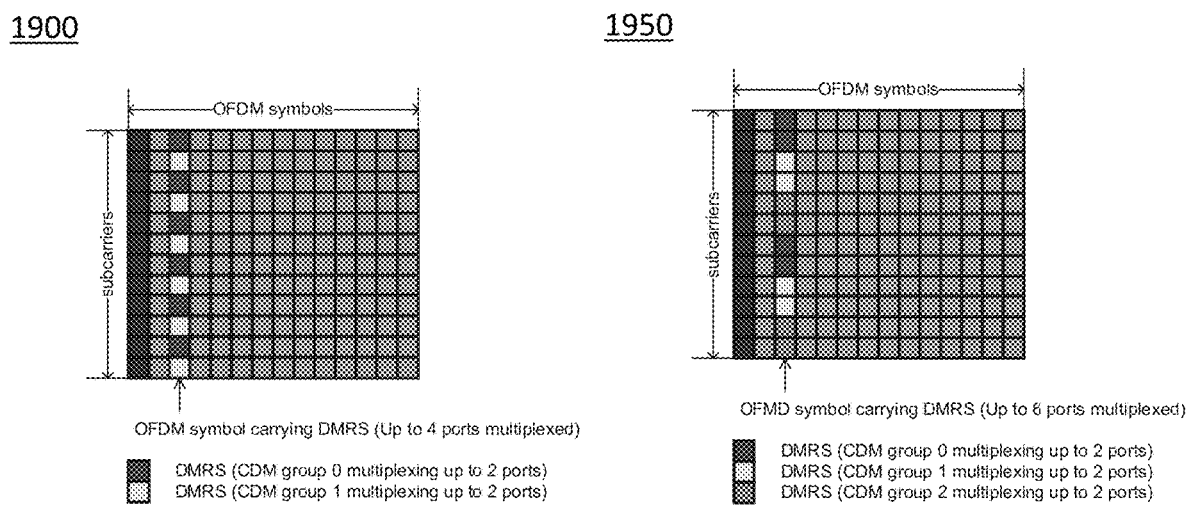
FIG. 19 illustrates examples related to DMRSs and/or PT-RSs in accordance with some embodiments.
Figure 20:
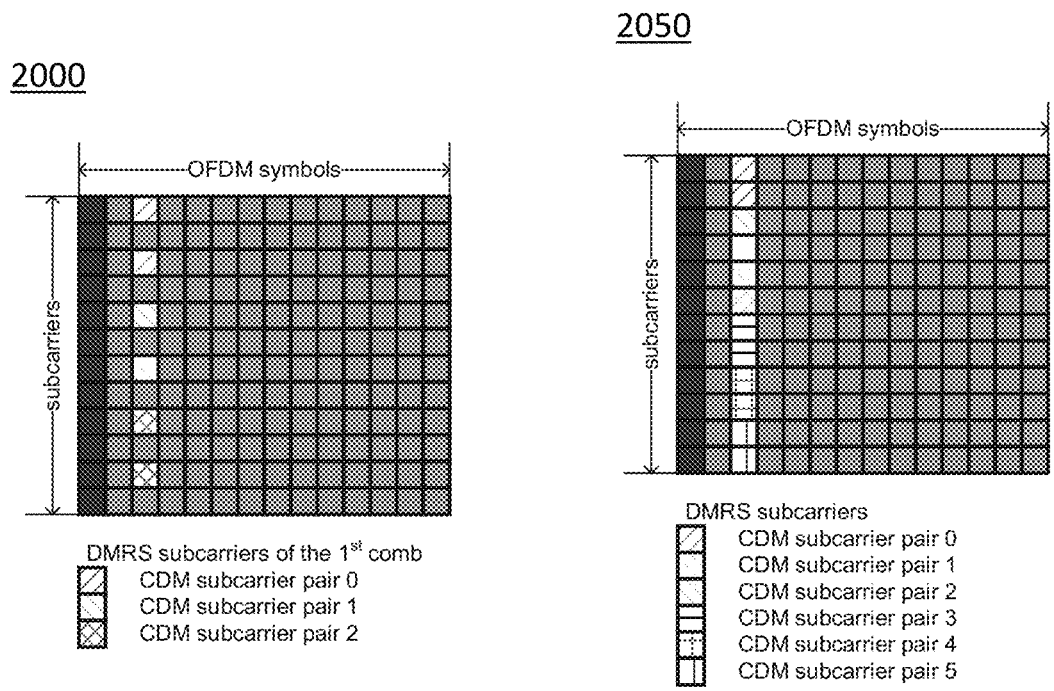
FIG. 20 illustrates examples related to DMRSs and/or PT-RSs in accordance with some embodiments.

In some embodiments, sidelink reference signal transmission in a wide system bandwidth may comprise enhanced DMRS patterns and physical structure per PRB as shown in FIG. 17.

In New Radio (NR) systems, a dedicated type of reference signal (RS) has been defined especially to estimate the phase fluctuations of downlink (DL) or uplink (UL) signal appeared due to, e.g., Tx/Rx phase noise (PN). In the NR technical specifications, the signal is referred to as phase tracking reference signal (PT-RS). The phase estimates obtained after PT-RS reception and demodulation can be further compensated by the UE receiver to improve the overall performance.

The current design of PT-RS in NR assumes that the RS is transmitted from the same logical antenna port as one of the UE-specific Demodulation RSs (DM-RSs) used for the coherent demodulation of the Physical Downlink Shared Channel (PDSCH) or Physical Uplink Shared Channel (PUSCH). Moreover, associated PT-RS and DM-RS antenna ports share the same subcarrier in a physical resource block (PRB) used for the PDSCH or PUSCH, as illustrated in 1800 in FIG. 18.

One important note regarding the DM-RS design in NR is that it assumes the same resource elements (REs) are shared by multiple DM-RS antenna ports. In this case, the code division multiplexing (CDM) is used to distinguish between different DM-RS antenna ports. In particular, for DM-RS type 1 (an example for one OFDM symbol is illustrated in 1900 in FIG. 19) two adjacent even or odd subcarriers over one or two OFDM symbols are used to transmit two or more antenna ports. Similarly, for DM-RS type 2 (an example for one OFDM symbol is illustrated in 1950 in FIG. 19), two adjacent subcarriers over one or two OFDM symbols are used to transmit two or more DM-RS antenna ports. Therefore, the channel estimation needed for coherent PDSCH/PUSCH demodulation requires de-multiplexing of the DL/UL DM-RS ports which is performed by the de-spreading of the CDM codes.

After de-spreading, the obtained channel estimates are slightly different from the actual channel observed on the corresponding DM-RS subcarriers. The difference is small in case of low frequency selective channels. However, the situation may change in the channels with a large delay spread where high frequency selectivity is typical. In highly frequency selective channels the DM-RS based channel estimates badly reflect the observed channel.

Moreover, DM-RS based channel estimates can be used for coherent demodulation of PT-RS for phase difference estimation caused by PN. However, PT-RS doesn't require any de-spreading operation for PN compensation because PT-RS is transmitted from a single antenna port (which is the same as one of the DM-RS antenna ports). Thus, in highly frequency selective channels the PN compensation based on PT-RS may be distorted by the de-spreading operation on DM-RS.

Related to the impact of DM-RS de-spreading on PN estimation and compensation, the current PT-RS design together with DM-RS de-spreading may degrade the receiver performance in highly frequency selective channels, in some cases.

In addition, the existing PT-RS structure in Rel-15 NR supports uniform allocation of the PT-RS REs distributed over PDSCH or PUSCH allocation, which prevents UE to estimate the PN variation within OFDM symbol.

In some cases, PT-RS in Rel-15 support only uniform distributed PT-RS allocation in the frequency domain. In some cases, PT-RS subcarrier is the same as one of DM-RS subcarriers. In some cases, DM-RS de-spreading in the frequency domain brings an additional phase error which is propagated through phase estimates tracked by PT-RS. In some cases, intra OFDM symbol PN estimation is difficult with the existing PT-RS structure.

In some embodiments, one or more enhancements to PT-RS may be used. In some embodiments, one or more enhancements may be related to PT-RS transmission on the subcarriers equidistant to DM-RS subcarrier of the same CDM group. In some cases, the proposed solution improves the receiver performance and approaches the idealistic case (without DM-RS de-spreading). In some embodiments, PT-RS transmission on a group of subcarriers with uniform distribution of the PT-RS subcarrier groups within resource allocation of the UE 102 may be performed.

In some cases, the proposed PT-RS structure provides better accuracy of phase tracking. It also allows estimation of the phase variation within OFDM symbol.

In some embodiments, for CDM of DM-RS in the frequency domain, the spreading code and, therefore, de-spreading operation at the receiver, is applied in a pair-wise manner, i.e., to two adjacent DM-RS subcarriers. For explanation purposes, every two adjacent DM-RS subcarriers used for de-spreading operation are referred here to as CDM subcarrier pair. For a particular antenna port, DM-RS occupies multiple CDM subcarrier pairs. An illustration of CDM subcarrier pairs for DM-RS type 1 and DM-RS type 2 is given in 2000 and 2050 in FIG. 20, respectively.

Figure 21:
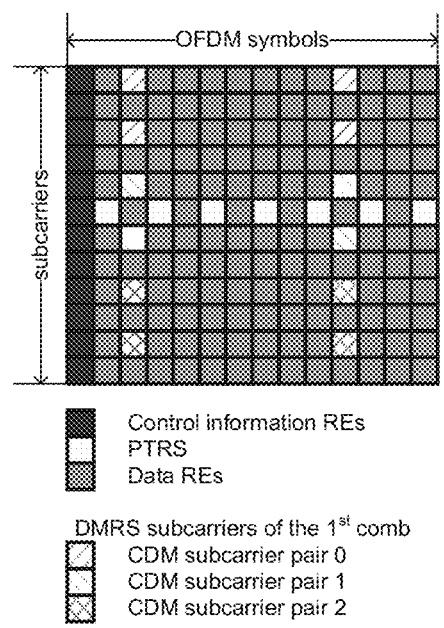
FIG. 21 illustrates examples related to DMRSs and/or PT-RSs in accordance with some embodiments.

In some embodiments, one or more enhancements to PT-RS may be used. In particular the following enhancement is described. PT-RS transmission on the subcarriers equidistant to DM-RS subcarrier of the same CDM group. According to this embodiment, for DM-RS type 1 supporting comb structure of DM-RS pattern (2 combs can be defined for DM-RS type 1 shifted by a subcarrier one relative to another), the PT-RS in the frequency domain resides between two subcarriers of DM-RS corresponding to the same DM-RS group. FIG. 21 illustrates an example 2100 in more details, where one comb of DM-RS Type 1 pattern is shown for a PRB containing PT-RS REs. Different to the current PT-RS transmission illustrated in FIG. 18, the PT-RS in 2100 in FIG. 21 is transmitted on the subcarrier between two subcarriers of the CDM subcarrier pair.

Figure 22:
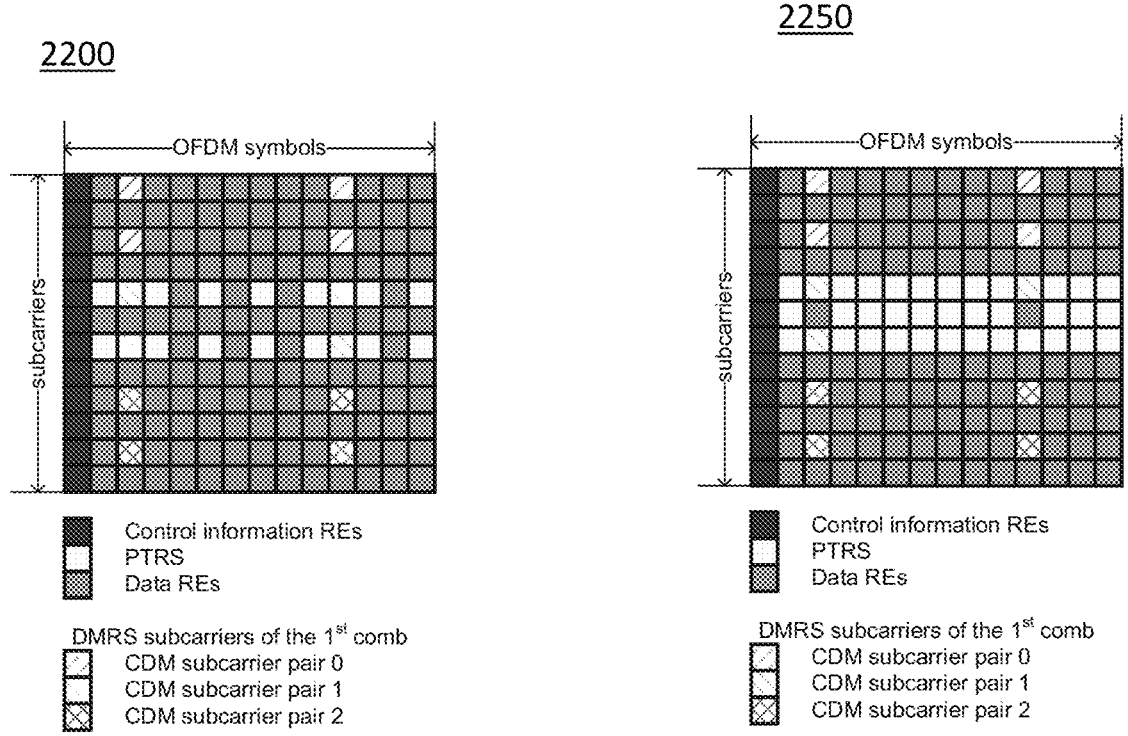
FIG. 22 illustrates examples related to DMRSs and/or PT-RSs in accordance with some embodiments.

In another example of this embodiment, the PT-RS may be transmitted on all subcarriers occupied by a CDM subcarrier pair as shown in 2200 in FIG. 22. In this embodiment the density of PT-RS across PRBs can be reduced by half to maintain the same overhead due to PT-RS. In the other example of this embodiment, the PT-RS may be transmitted on all subcarriers occupied by a CDM subcarrier pair and subcarrier not occupied by the CDM subcarrier pair as shown in 2250 in FIG. 22. Such PT-RS structure also allows estimation of the phase variation within the corresponding OFDM symbol. In this example, PT-RS is also transmitted every OFDM symbol of the slot.

Figure 23:
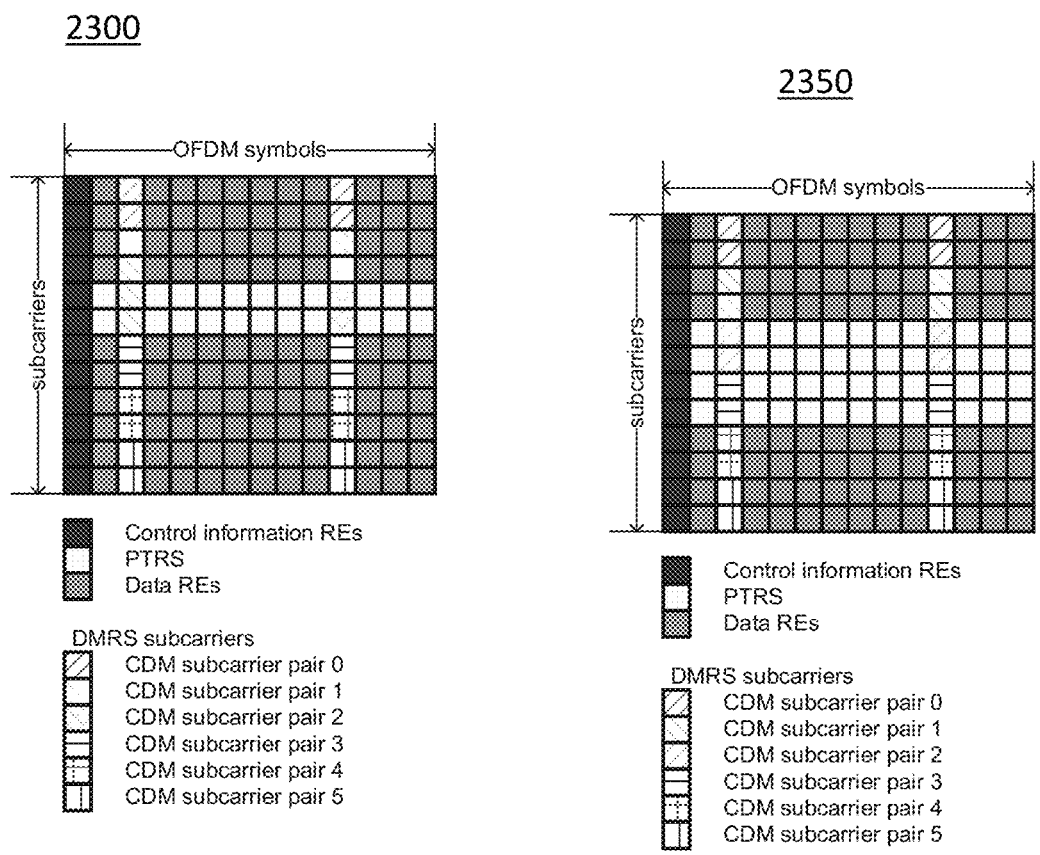
FIG. 23 illustrates examples related to DMRSs and/or PT-RSs in accordance with some embodiments.

In some embodiments, PT-RS transmission on the group of subcarriers can be also supported for DM-RS Type 2 structure as shown in FIG. 23. The PT-RS can be also transmitted over adjacent subcarriers, i.e., on the subcarriers occupied by one or more CDM subcarrier pair as shown in 2300 and 2350, respectively.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a machine type communication (MTC) User Equipment (UE) configured, the apparatus comprising:
   at least one processor, configured to:
      decode a primary synchronization signal (PSS) and a secondary synchronization signal (SSS) received from a base station;
      determine a system timing based on reception of the PSS and the SSS;
      decode radio resource control (RRC) signaling from the base station, the RRC signaling received in accordance with the determined system timing, wherein the RRC signaling indicates parameters of a resynchronization signal (RSS) for resynchronization by the MTC UE, wherein the parameters of the RSS in the RRC signaling include a starting physical resource block (PRB) of the RSS and an indication of a number of continuous slots allocated for the RSS;
      decode the RSS, the RSS received from the base station, wherein the RSS includes a single synchronization sequence mapped to resource elements configured for RSS transmission in a slot, wherein the single synchronization sequence is mapped to the resource elements in a frequency-first time-second manner, across subcarriers in frequency and orthogonal frequency division multiplexing (OFDM) symbols in time; and
      determine an updated system timing based on reception of the RSS.

2. The apparatus according to claim 1, wherein:
   the parameters of the RSS in the RRC signaling further include one or more of:
      a starting orthogonal frequency division multiplexing (OFDM) symbol of the RSS within each of the continuous slots allocated for the RSS, and
      a number of physical resource blocks (PRBs) allocated for the RSS.

3. The apparatus according to claim 2, wherein the parameters of the RSS in the RRC signaling are related to a number of diversity repetitions of the RSS corresponding to target coverage of the MTC UE.

4. The apparatus according to claim 2, wherein:
   the number of continuous slots allocated for the RSS is one of 4, 8, 16, 32, 48, and 64, and
   the number of PRBs allocated for the RSS is one of 2, 4, and 6.

5. The apparatus according to claim 2, wherein the parameters of the RSS in the RRC signaling further include:
   a number of continuous slots allocated for a secondary RSS (SRSS), a starting OFDM symbol of the SRSS within each of the continuous slots allocated for the SRSS,
   a number of PRBs allocated for the SRSS, and
   a starting PRB of the SRSS.

6. The apparatus according to claim 2, wherein:
   the RSS includes periodic RSS bursts, wherein each RSS burst includes a primary RSS (PRSS) and a secondary RSS (SRSS), and
   the parameters of the RSS in the RRC signaling further include a periodicity of the RSS bursts.

7. The apparatus according to claim 2, wherein the parameters of the RSS in the RRC signaling further include:
   a time duration for quasi co-located (QCL) transmission of the RSS on a same transmit antenna port,
   wherein the time duration of the QCL transmission of the RSS is indicated in terms of a number of repetitions of a base sequence of the PRSS.

8. The apparatus according to claim 2, wherein:
   the parameters of the RSS in the RRC signaling further include a number of orthogonal frequency division multiplexing (OFDM) symbols for a base sequence of the PRSS, and
   the at least one processor is further configured to:
      determine the base sequence of the PRSS based at least partly on the number of OFDM symbols for the base sequence of the PRSS; and
      detect the PRSS based at least partly on a correlation operation between a received signal and the base sequence of the PRSS.

9. The apparatus according to claim 8, wherein the at least one processor is further configured to:
   determine the PRSS based on:
      a first mapping of the base sequence of the PRSS to resource elements (REs) of the PRBs allocated for the PRSS, and
      a second mapping of the base sequence of the PRSS to OFDM symbols of the slots allocated for the PRSS, the second mapping after the first mapping.

10. The apparatus according to claim 2, wherein the at least one processor is further configured to:
    transition the MTC UE to a power save mode;
    refrain from reception of signals or transmission of signals for at least a portion of a duration of time in which the MTC UE is in the power save mode;
    awaken the MTC UE from the power save mode,
    wherein the RSS is received after the MTC UE awakens from the power save mode.

11. The apparatus according to claim 10, wherein the at least one processor is configured to configure the MTC UE to receive the RSS based on a previous value of the system timing used before the MTC UE transitioned to the power save mode.

12. The apparatus according to claim 2, wherein:
    the PSS and the SSS are cell-specific based on a cell of the base station, and
    the RSS is UE-specific for the MTC UE.

13. The apparatus according to claim 2, wherein the at least one processor is further configured to:
    as part of a cell selection for the MTC:
       detect the RSS;
       determine, based on a physical cell identifier (PCI) included in the RSS, whether the RSS is from the base station or from another base station; and
       communicate with the base station from which the RSS is received.

14. The apparatus according to claim 2, wherein the at least one processor is configured to configure the MTC UE to receive the PSS and the SSS in joint time and frequency resources that are at least partly non-overlapping with joint time and frequency resources allocated for the RSS.

15. The apparatus according to claim 2, wherein:
    the apparatus includes a transceiver to receive the RSS,
    the at least one processor includes a baseband processor to decode the RSS.

16. A non-transitory, computer accessible memory medium storing program instructions executable by a processor of a machine type communication (MTC) User Equipment (UE) to:
- decode a primary synchronization signal (PSS) and a secondary synchronization signal (SSS) received from a base station;
- determine a system timing based on reception of the PSS and the SSS;
- decode radio resource control (RRC) signaling from the base station, the RRC signaling received in accordance with the determined system timing, wherein the RRC signaling indicates parameters of a resynchronization signal (RSS) for resynchronization by the MTC UE, wherein the parameters of the RSS in the RRC signaling include a starting physical resource block (PRB) of the RSS and an indication of a number of continuous slots allocated for the RSS;
- decode the RSS, the RSS received from the base station, wherein the RSS includes a single synchronization sequence mapped to resource elements configured for RSS transmission in a slot, wherein the single synchronization sequence is mapped to the resource elements in a frequency-first time-second manner, across subcarriers in frequency and orthogonal frequency division multiplexing (OFDM) symbols in time; and
- determine an updated system timing based on reception of the RSS.

17. The non-transitory, computer accessible memory medium of claim 16, wherein the parameters of the RSS in the RRC signaling further include one or more of:
- a starting orthogonal frequency division multiplexing (OFDM) symbol of the RSS within each of the continuous slots allocated for the RSS, and
- a number of physical resource blocks (PRBs) allocated for the RSS.

18. The non-transitory, computer accessible memory medium of claim 17, wherein:
- the PSS and the SSS are cell-specific based on a cell of the base station, and
- the RSS is UE-specific for the MTC UE.

19. A method for operating a machine type communication (MTC) User Equipment (UE), comprising:
- by the MTC UE:
  - decoding a primary synchronization signal (PSS) and a secondary synchronization signal (SSS) received from a base station;
  - determining a system timing based on reception of the PSS and the SSS;
  - decoding radio resource control (RRC) signaling from the base station, the RRC signaling received in accordance with the determined system timing, wherein the RRC signaling indicates parameters of a resynchronization signal (RSS) for resynchronization by the MTC UE, wherein the parameters of the RSS in the RRC signaling include a starting physical resource block (PRB) of the RSS and an indication of a number of continuous slots allocated for the RSS;
  - decoding the RSS, the RSS received from the base station, wherein the RSS includes a single synchronization sequence mapped to resource elements configured for RSS transmission in a slot, wherein the single synchronization sequence is mapped to the resource elements in a frequency-first time-second manner, across subcarriers in frequency and orthogonal frequency division multiplexing (OFDM) symbols in time; and
  - determining an updated system timing based on reception of the RSS.

20. The method of claim 19, wherein the parameters of the RSS in the RRC signaling further include one or more of:
- a starting orthogonal frequency division multiplexing (OFDM) symbol of the RSS within each of the continuous slots allocated for the RSS, and
- a number of physical resource blocks (PRBs) allocated for the RSS.

21. The method of claim 20, wherein:
- the PSS and the SSS are cell-specific based on a cell of the base station, and
- the RSS is UE-specific for the MTC UE.

* * * * *